United States Patent
D'Souza

(10) Patent No.: US 6,446,218 B1
(45) Date of Patent: Sep. 3, 2002

(54) TECHNIQUES FOR MAINTAINING FAULT TOLERANCE FOR SOFTWARE PROGRAMS IN A CLUSTERED COMPUTER SYSTEM

(75) Inventor: Roy P. D'Souza, Sunnyvale, CA (US)

(73) Assignee: B-Hub, Inc., Santa Clara, CA (US)

( * ) Notice: Subject to any disclaimer, the term of this patent is extended or adjusted under 35 U.S.C. 154(b) by 0 days.

(21) Appl. No.: 09/346,000

(22) Filed: Jun. 30, 1999

(51) Int. Cl.$^7$ ............................................... G06F 15/16
(52) U.S. Cl. .............................. 714/4; 714/47; 709/105
(58) Field of Search ....................... 714/47, 4; 709/229, 709/105, 104

(56) References Cited

U.S. PATENT DOCUMENTS

| | | | | |
|---|---|---|---|---|
| 5,369,570 A | * | 11/1994 | Parad | 700/99 |
| 5,465,328 A | | 11/1995 | Dievendorff et al. | 395/182.13 |
| 5,664,093 A | | 9/1997 | Barnett et al. | 395/183.07 |
| 5,751,964 A | | 5/1998 | Ordanic et al. | 395/200.54 |
| 5,884,038 A | | 3/1999 | Kapoor | 395/200.56 |
| 5,938,732 A | * | 8/1999 | Lim et al. | 709/226 |
| 5,951,694 A | | 9/1999 | Choquier et al. | 714/15 |
| 5,953,389 A | | 9/1999 | Pruett et al. | 379/9 |
| 5,956,662 A | | 9/1999 | Hemker et al. | 702/182 |
| 5,974,454 A | | 10/1999 | Apfel et al. | 709/221 |
| 5,996,086 A | * | 11/1999 | Delaney et al. | 709/225 |
| 6,026,425 A | | 2/2000 | Suguri et al. | 709/105 |
| 6,065,046 A | | 5/2000 | Feinberg et al. | 709/216 |
| 6,108,703 A | | 8/2000 | Leighton et al. | 709/226 |
| 6,119,143 A | * | 9/2000 | Dias et al. | 709/105 |
| 6,134,673 A | * | 10/2000 | Chrabaszcz | 714/10 |
| 6,148,324 A | | 11/2000 | Ransom et al. | 709/105 |
| 6,167,427 A | * | 12/2000 | Rabinovich et al. | 707/204 |
| 6,167,538 A | | 12/2000 | Neufeld et al. | 714/47 |

(List continued on next page.)

FOREIGN PATENT DOCUMENTS

WO   WO-0062502 A3 * 10/2000 ............ H04I/29/06

OTHER PUBLICATIONS

Terrence Rourke, "Application server", Jul. 23, 2001, whatis?com. <http://searchdatabase.techtarget.com/sDefinition/0,,sid13_gci211584,00.html> [accessed Jan. 21, 2002].*

Primary Examiner—Scott Baderman
Assistant Examiner—Gabriel Chu
(74) Attorney, Agent, or Firm—Beyer Weaver & Thomas, LLP

(57) ABSTRACT

A method for maintaining a predefined acceptable fault tolerance level for a plurality of software modules implementing a software program running on a first plurality of computers coupled together in a cluster configuration in a first cluster in a clustered computer system. The first plurality of computers being coupled to a first intelligent director agent. The method includes tracking, using the first intelligent director agent, status of the software modules running on the first plurality of computers. The method also includes ascertaining a fault tolerance level associated with the software program, with the ascertaining being ascertained by examining the status of the software modules running on the first plurality of computers. If the fault tolerance level is below the predefined acceptable fault tolerance level, the method also includes searching for a first suitable computer among the first plurality of computers to load another module of the software program thereon. The first suitable computer represents a computer of the first plurality of computers that does not have a module of the software program running thereon. The first suitable computer is compatible to execute the another copy of the computer program. If the first suitable computer is available, the method further includes loading the another module of the software program on the first suitable computer, registering the first suitable computer as a computer capable of servicing transaction requests pertaining to the software program after the another module of the software program is loaded onto the first suitable computer, and routing the transaction requests pertaining to the software program to the first suitable computer after the registering.

12 Claims, 13 Drawing Sheets

U.S. PATENT DOCUMENTS

| | | |
|---|---|---|
| 6,175,869 B1 | 1/2001 | Ahuja et al. ................. 709/226 |
| 6,185,601 B1 | 2/2001 | Wolff ......................... 709/203 |
| 6,195,680 B1 | 2/2001 | Goldszmidt et al. ........ 709/203 |
| 6,219,801 B1 | 4/2001 | Yuge et al. ................... 714/13 |
| 6,249,801 B1 * | 6/2001 | Zisapel et al. ............... 709/105 |
| 6,259,705 B1 | 7/2001 | Takahashi et al. .......... 370/465 |
| 6,289,380 B1 | 9/2001 | Battat et al. ................. 709/224 |
| 6,298,451 B1 | 10/2001 | Lin ................................ 714/4 |
| 6,314,526 B1 * | 11/2001 | Arendt et al. .................. 707/10 |
| 6,317,786 B1 | 11/2001 | Yamane et al. ............. 709/224 |
| 6,327,622 B1 * | 12/2001 | Jindal et al. ................. 709/105 |

* cited by examiner

TECHNIQUES FOR MAINTAINING FAULT TOLERANCE FOR SOFTWARE PROGRAMS IN A CLUSTERED COMPUTER SYSTEM

BACKGROUND OF THE INVENTION

List of Related Applications

The following applications are related to the present disclosure and are incorporated by reference herein.

Application entitled "Data Mining Aggregator Architecture with Intelligent Selector (Attorney Docket No. BHUBP001), filed on even date by inventor Roy P. D'Souza; application entitled "Data Mining with Dynamic Events (Attorney Docket No. BHUBP002), filed on even date by inventor Roy P. D'Souza; and application entitled "Data Mining with Decoupled Policy From Business Application (Attorney Docket No. BHUBP003), filed on even date by inventor Roy P. D'Souza.

The present invention relates to an improved computer architecture. More particularly, the present invention relates to techniques for improving the reliability and response time of a scalable computer system of the type employed in e-commerce applications through the Internet.

E-commerce, or electronic commerce through the Internet, places stringent requirements on the planning and implementation of the computer infrastructure that supports the service. As the e-commerce service is in its infancy, it is important for economic reasons to minimize the cost of the computing infrastructure employed to service the few initial users or early adopters. As the use of the service becomes wide-spread among many users, which in the e-commerce age could be in a matter of days or weeks, the initial computing infrastructure must grow correspondingly to offer reliable and fast service to users or risk losing users to competing services.

To facilitate scaling of computing capabilities to meet a potentially explosive growing demand while minimizing upfront costs, many scalable architectures have been proposed. In one approach, the processing load is borne by a single centrally located computer and as the processing load increases, that computer may be upgraded to have a more powerful processor or, in the case with parallel processors, be endowed with additional processors to handle a higher processing load.

However, there are limits to the level of processing power that can be provided by a single machine. This is typically due to limitations in the processing capability of the single processor or in the upper limit on the number of parallel processors that can be provisioned in the computer. Further, limitations in memory access, bus speed, I/O speed and/or the like also tend to place an upper limit on the ultimate processing capability this approach can offer. Even if the ultimate upper limit is not reached, there are economic disincentives to adopting this approach for e-commerce usage due to the fact that marginal increases in computing power for these high-end machines tend to come at great financial cost. For example, a two-fold increase in processing power of such a computer typically requires substantially more than a two-fold increase in cost.

Clustering represents another computer architecture that readily scales to adapt to changing processing loads. In clustering, multiple inexpensive and/or low power computers are clustered together to service the processing load. Typically, the individual computers are interconnected using some type of network connection, such as Ethernet. Each time a machine is connected to the cluster, it publishes its presence to the cluster to signal its ability to share the processing load. Thus, as the processing load increases or decreases, the number of computers in the cluster may be correspondingly increased or decreased to meet the need of the changing processing load.

To facilitate discussion, FIG. 1 illustrates a prior art computer architecture wherein the computers are clustered in various stages to service the processing needs of the stages. With reference to FIG. 1, there is shown a computer system 102, representing a typical prior art clustered computer system employed to service Internet-based transaction requests. Computer system 102, which is typically connected to a larger network such as the Internet or a portion thereof, includes a webserver stage 104, application server stage 106, and a data repository stage 108. As can be seen in FIG. 1, each stage is implemented by a group or cluster of servers.

In general, a user may access computer system 102 by typing in a URL (Uniform Resource Locator) and obtaining a page from a webserver of webserver stage 104. In the typical situation, the first few pages returned may include general introductory information as well as an authentication facility to allow the user to sign in. Once the user is properly authenticated (by entering user name and password, for example), a menu of contents and/or applications may then be served up to the user. If the user chooses an application, the request is serviced by one of the application servers in application server stage 106, which acts in concert with one or more databases in the data repository stage 108, to respond to the user's request.

Due to the use of clustering technology, however, many other intervening steps occur in between. Beginning with the user's access request 110 (by, for example, typing in the URL at the user's web browser), the request is forwarded to a webserver router 112, which arbitrates among the webservers 114(a)–114(e), to decide which of these webserver should service this user's request. As a threshold determination, webserver router 112 may ascertain whether the user had recently accessed the service through a particular webserver of webserver stage 104. If he did, there is usually data pertaining to this user that is cached at the webserver that last serviced him, and it may be more efficient to continue assigning this user to the webserver that serviced him earlier.

On the other hand, if it is determined that this user has not recently accessed the service or if there is no cached data pertaining to this user on any of the webservers, webserver router 112 may assign the user to one of webservers 114(a)–114(e). The decision of which webserver to assign is typically made based on the current load levels on the respective webservers, the information pertaining to which is periodically received by webserver router 112 from the webservers through path 116. Once the user is assigned one of the webservers, subsequent traffic may be directly transmitted between the user's terminal and the assigned webserver without going through the router.

After authentication, if the user subsequently indicates that he wishes to employ a particular application, the webserver assigned to him then accesses another router, which is shown in FIG. 1 as application server router 118. Like webserver router 112, application server 118 picks among application servers 120(a)–120(d) of application server stage 106 based on the current load levels on the application servers. The information pertaining to the current load levels on the application servers are periodically received by application server router 118 through path 122 as shown. At any rate, one of application servers 120(*a*)–120(*d*) will be assigned to the user to service the user's request. As in the case with the webservers, once the user is assigned one of the application servers, subsequent traffic may be directly transmitted between the web server that services the user and the assigned application server without going through the router that performed the assignment.

If the application employed by the user requires data from data repository stage 108, the application server may consult yet another router (shown in FIG. 1 as database router 130), which may pick the most suitable database server 132(*a*)–132(*c*) for serving up the data. Again, data base router 130 has information pertaining to the level of load on each database server since it periodically receives feedback from the database servers (via path 134).

Since the processing load at each stage is shared by multiple computers or servers, scalability is achieved. Further, the overall cost is kept low since the system employs multiple low power computers to achieve a high processing capacity, and only brings new computers to the cluster if needed.

Although the computer cluster architecture of prior art FIG. 1 solves many problems associated with scaling, it is recognized that there are areas where improvements are needed. By way of example, improved reliability is one area where continuous improvement is desired. In the context of highly demanding applications such as e-commerce, it is important that the computer system that services the user's transaction requests operates without interruption at all times. This is because the Internet is a global network, and at any time, transaction requests may be sent by users and need to be serviced. It is also recognized that one of the more vulnerable times for computer system failure occurs during or shortly after software upgrades, i.e., when the version of the software programs running on the servers (such as those running on application servers 120a–120d) are changed or when new software packages are loaded.

In the prior art, software upgrades are typically performed on a system-wide basis, using a new software package that is believed to be compatible with the computer system being upgraded. To minimize any impact on service, the upgrade operation typically occurs at a time when usage is relatively low. During a software upgrade operation, the whole computer system is typically taken offline momentarily, the new software is then loaded onto the servers, and the whole computer system is then quickly brought back into service to allow the new software to handle the incoming transaction requests.

If the new software to be loaded had been tested extensively in advance for quality and compatibility, one can expect that the majority of the software upgrade operations could be accomplished with only minor and temporary inconvenience to the users. For some software upgrade operations, however, catastrophic crashes could and did occur. The catastrophic system-wide failures can occur despite the best quality assurance testing since modern software programs are complicated constructs, and their behavior when exposed for the first time to a computer and/or network that had other software, plug-ins, drivers, and the like already installed is not always predictable. In a critical application such as e-commerce, the consequence of such a system-wide failure can be extremely serious as it may result in lost sales, erode user's confidence, and may lead to the loss of customers to competitors. With regard to maintaining reliability during and after software upgrades, an improved approach is clearly needed.

Even in day-to-day operation, reliability is a big concern since users in the e-commerce age expect continuous uninterrupted service and will not hesitate to switch to competing services if their expectation is not met. One way to improve reliability is to employ dedicated software/hardware to watch over the entire computer system in order to ensure that there exists a sufficiently high level of fault tolerance so that if there is failure in one of the servers, there remains adequate processing power to provide an acceptable level of service to customers, e.g., by handling their requests in an uninterrupted manner and without unduly long delays. If the fault tolerance level falls below some acceptable level in a cluster, the fault tolerance mechanism will alert the operator to permit the operator to bring the fault tolerance back up, e.g., by adding additional servers to the cluster. This situation typically occurs after one of the servers in the cluster fails and the number of redundant servers remaining is unacceptably low.

In prior art, fault tolerance is achieved at the server level, i.e., by maintaining a sufficiently large number of servers per cluster to ensure that if there is a failure in one of the servers, there still remains sufficient processing capability in the surviving servers to allow the computer system as a whole to continue handling the transaction requests. Furthermore, prior art fault tolerance solutions are typically offered on homogeneous clusters and are specifically tied to specific computers from specific vendors. With reference to FIG. 1, for example, the prior art technique of fault tolerance typically requires that all servers in a cluster (i.e., all servers serviced by a router such as servers 120a–120d of FIG. 1) be homogeneous.

There are, however, disadvantages to the prior art approach to implementing fault tolerance. For many businesses, it is sometimes more efficient to employ preexisting software programs and modules in servicing their customers' needs than to develop their own software programs. Furthermore, it is sometimes more efficient to aggregate different software modules from different vendors to offer a complete package of service to customers than to employ software modules from a single vendor since different vendors may offer different advantages. By picking and choosing among the modules offered by competing vendors, a business may be able to gain competitive advantages by offering a better aggregate service to their customers.

In these cases, the software modules that are employed, as well as the hardware platforms on which they are implemented, are often highly diverse. Since prior art techniques of fault tolerance requires homogeneity of hardware in a cluster, the diverse mix of software and hardware of such businesses renders it difficult to implement fault tolerance. One possible solution is to implement a homogeneous cluster for each software module so that fault tolerance can be achieved with respect to that software module (e.g., by providing multiple redundant servers per software module). This solution is, however, practical only when the number of different sets of software modules employed is relative small. If the number of different sets of modules employed is fairly large, the solution becomes extremely costly as there needs to be one cluster per set of software modules to implement the prior art technique of fault tolerance.

Another area that system engineers always strive to improve relates to reducing transaction request processing time. Because of scaling and the desire to implement fault tolerance, it is typically the case that there exist multiple copies of any given application program per cluster. With reference to FIG. 1, for example, there typically exist multiple copies of an application program, distributed among two or more of servers 120a–120d. Because there are multiple copies present in the cluster to service incoming transaction requests, it is important to appropriately distribute the processing requirements of the multiple users across the servers so that transaction requests may be more efficiently serviced, with no single server being overtaxed while others are idle.

If all servers of a cluster are homogeneous, the decision regarding which server in the cluster should service a new user can be made by simply examining the relative load levels among the servers that have the appropriate software to handle the incoming transaction request of that user, and by assigning the new user to the server that is least heavily loaded. By distributing the users among various servers according to the relative load levels experienced by the servers, the average processing time for transaction requests is, in theory, minimized. In fact, most modem routers have the capability to receive relative load level data for the servers they service, and can make decisions pertaining to user routing based on the relative load level data.

However, it has been found that when the servers of a cluster are heterogeneous and differ in their processing capabilities, such simple routing strategies sometimes do not provide users with the best possible processing time. This is because a more powerful server may appear slightly more heavily loaded yet may be able to process incoming transaction requests more rapidly than a less powerful server in the cluster that happens to be more lightly loaded. Yet, a simple routing strategy based on relative load levels among servers would have picked the more lightly loaded (and less powerful) server, with a concomitantly longer processing time for transaction requests that are so routed.

Further, there may exist reasons for keeping a particular server relatively lightly loaded (e.g., due to the fact that the lightly loaded server is being stress-tested and not yet certified to handle a full load, or due to the fact that the lightly loaded server also implements another application program, which is of the type that is subject to sudden, rapidly fluctuating processing demands and therefore needs a large reserve processing capacity). For the heterogeneous cluster situation and other preferential routing situations, the prior art method of routing incoming transaction requests leaves a lot to be desired.

Other areas for improvement also exist in the prior art cluster architecture. By way of example, in a typical clustered computer system, some of the servers thereon may be underutilized while other servers are overloaded despite efforts to equitably distribute transaction requests among the servers of the cluster. This is due to the fact that not every server in the cluster may be provided with the same set of application programs. Accordingly, while some servers are severely stressed, other servers, which do not have thereon the application programs that are in heavy demand, may sit idle.

In the prior art, whenever the load level on a particular server of the cluster is unacceptably high, the relative load level information among the cluster triggers an alert. To reduce the load level, the response is typically to add additional servers to the cluster to increase the number of copies of the application program that is in heavy demand, thereby increasing the ability of the computer system as a whole to handle transaction requests that require the attention of that application program.

As can be appreciated by those skilled in the art, the addition of a server to a cluster is typically an expensive option and usually involves a substantial delay and investment in time since it requires the acquisition, installation, and configuration of new hardware in the existing cluster. Unfortunately, while the new server is acquired and/or installed, user responsiveness suffers as the overloaded servers struggle to keep up with incoming transaction requests. Moreover, such an approach to handling temporary increases in traffic makes inefficient use of the existing server processing resource of the cluster because at the same time that the new servers are added to handle the increased demand that is experienced by some servers of the cluster, other servers of the cluster may sit relatively idle. If this approach is taken, the number of servers required to handle peak demand for every application program implemented in the cluster may be disproportionately large relative to the average processing requirement placed on the cluster. This is because demands on different application programs may fluctuate at different times, and an application program that may be idle at one point in time may be heavily used at other times, and vice versa.

Up to now, the discussion has revolved around reactive approaches (i.e., after-the-fact approaches) to ensuring that there is always sufficient processing capability to handle the transaction requests in an appropriate manner. In many cases, a reactive approach may not be sufficient to ensure that service disruption and/or delays associated with transaction request processing will be kept within acceptable parameters. By way of example, by the time it is discovered that a particular server is overloaded, it may be too late to begin the process of adding another server to share the processing load. This is because, as mentioned earlier, such a process is typically time-consuming and thus it may be some time before additional processing resources become available to the cluster. During that time, the servers that implement the software program in demand may be overloaded one-by-one and that overload may lead to a situation wherein none of the users' transaction requests are serviced in a timely manner. Thus, there are desired proactive approaches to load balancing that can ready the cluster for handling the increased processing load before it occurs.

In some area of the world, outside influences, such as natural and manmade disasters, may pose a serious threat to the reliability of the e-commerce service. By way of example, some regions of the United States are exposed to seasonal storms or to earthquakes. As such it is sometimes desirable to implement the servers in each of the stages of the clustered computer system in different geographic locations. As one example, the application server stage 106 of FIG. 1 may be implemented by two clusters of servers, with one being located in San Francisco while the other is located in New York. When such remote implementation is employed, the presence of the redundant servers further complicates the earlier mentioned challenges regarding maintaining reliability during and after software upgrades, efficient routing of transaction requests, maintaining an acceptable fault tolerance level in a heterogeneous cluster, and handling increases in the number of transaction requests both reactively and prospectively.

In view of the foregoing, there are desired novel and improved computer architectures and techniques for increasing the reliability and reducing the response time of a clustered computer system.

SUMMARY OF THE INVENTION

The invention relates, in one embodiment, to techniques for maintaining an adequate level of fault tolerance for a software program implemented on computers of a cluster in a clustered computer system. In one embodiment, the invention includes the use of intelligent director agents that are coupled to the computers of the cluster and the computer-specific as well as the software module-specific information stored therein. These pieces of information permit the intelligent detection of a deficiency in fault tolerance, the intelligent selection of a computer capable of running another copy of the software program, the loading of another copy of the software program on the identified computer, and the registration of the identified computer for servicing transaction requests pertaining to the software program after another copy of the software program is loaded thereon. Techniques are described to permit both computers in a local cluster and computers in a remote cluster to serve the fault tolerance relief role.

In one embodiment, the invention relates to a method for maintaining a predefined acceptable fault tolerance level for a plurality of software modules implementing a software program running on a first plurality of computers coupled together in a cluster configuration in a first cluster in a clustered computer system. The first plurality of computers being coupled to a first intelligent director agent. The method includes tracking, using the first intelligent director agent, status of the software modules running on the first plurality of computers. The method also includes ascertaining a fault tolerance level associated with the software program, with the ascertaining being ascertained by examining the status of the software modules running on the first plurality of computers. If the fault tolerance level is below the predefined acceptable fault tolerance level, the method also includes searching for a first suitable computer among the first plurality of computers to load another module of the software program thereon. The first suitable computer represents a computer of the first plurality of computers that does not have a module of the software program running thereon. The first suitable computer is compatible to execute the another copy of the computer program. If the first suitable computer is available, the method further includes loading the another module of the software program on the first suitable computer, registering the first suitable computer as a computer capable of servicing transaction requests pertaining to the software program after the another module of the software program is loaded onto the first suitable computer, and routing the transaction requests pertaining to the software program to the first suitable computer after the registering.

These and other advantages of the present invention will become apparent upon reading the following detailed descriptions and studying the various figures of the drawings.

BRIEF DESCRIPTION OF THE DRAWINGS

The present invention is illustrated by way of example, and not by way of limitation, in the figures of the accompanying drawings which are not drawn to scale to simplify the illustration and in which like reference numerals refer to similar elements.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
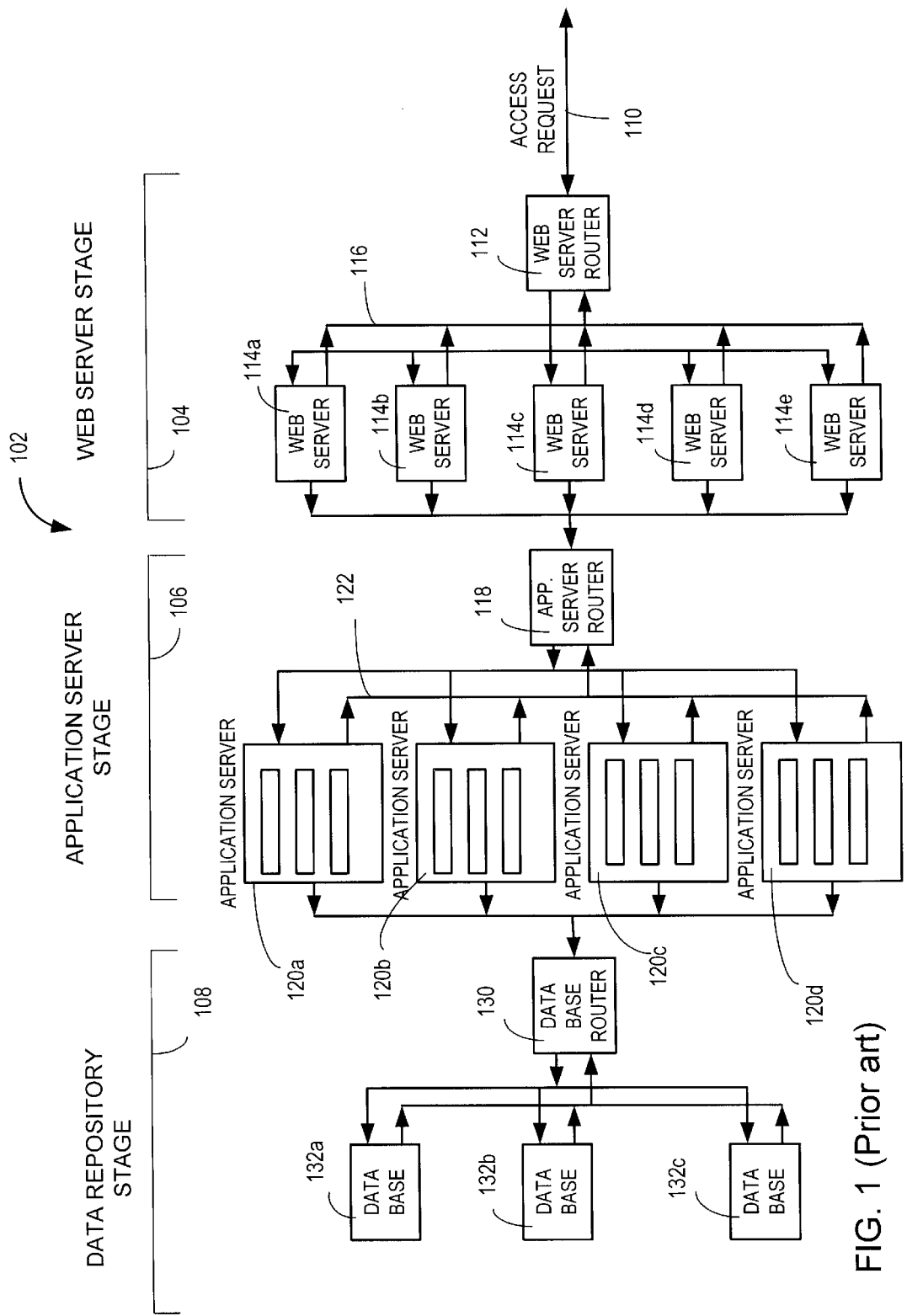
FIG. 1 illustrates a prior art computer architecture wherein the computers are clustered in various stages to service the processing needs of the stages.
Figure 2:
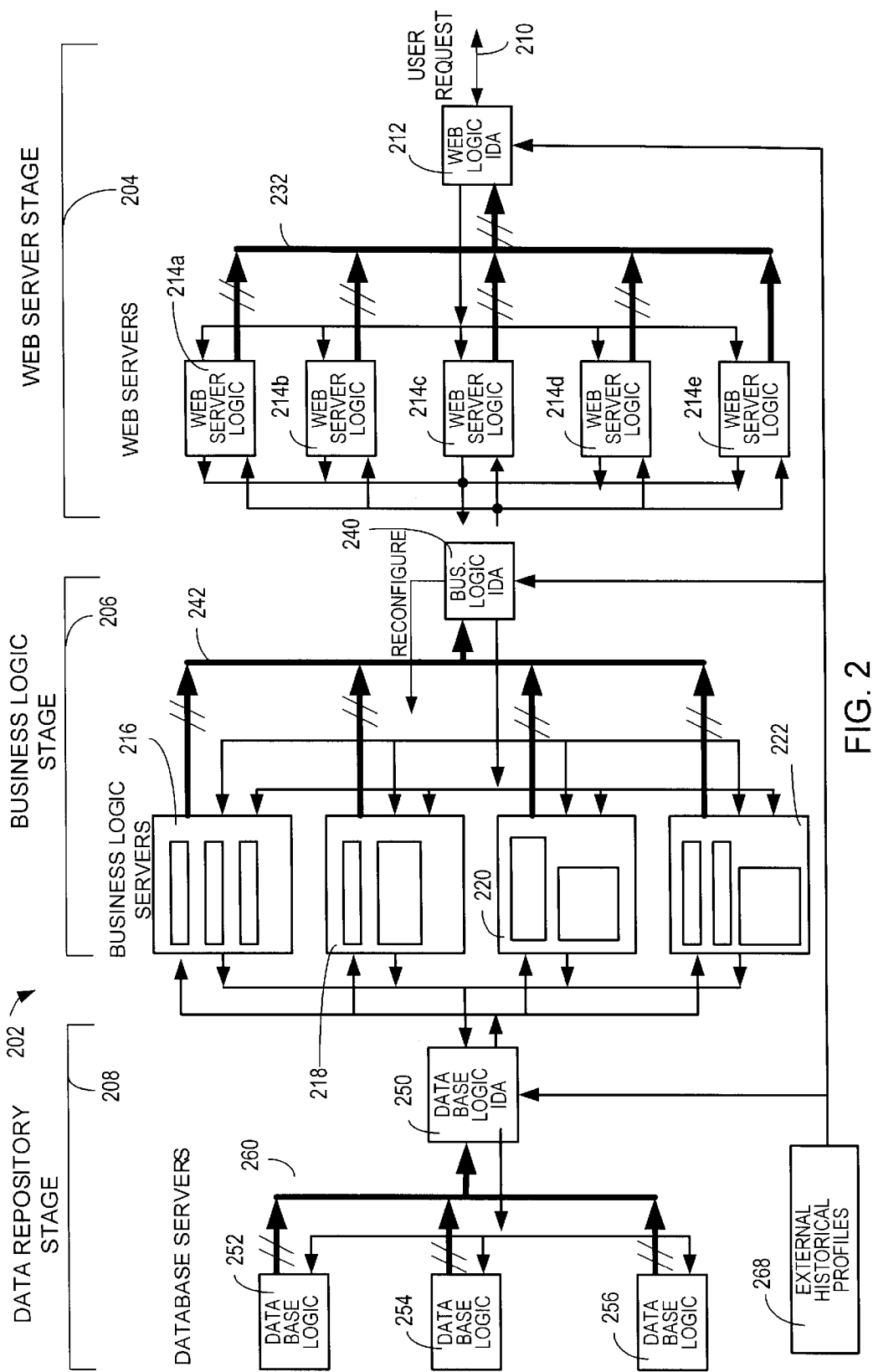
FIG. 2 illustrates, in accordance with one aspect of the present invention, a clustered computer system architecture wherein an intelligent director agent (IDA) is included with each of the clusters that implement the webserver stage, the business logic stage, and the data repository stage.

To facilitate discussion, FIG. 2 illustrates, in accordance with one aspect of the present invention, a clustered computer system architecture wherein an intelligent director agent (IDA) is included with each of the clusters that implement the webserver stage, the business logic stage, and the data repository stage. Preferably, there is an IDA for each cluster, although more than one cluster may be provided per stage, in which case multiple IDAs may be provided. Furthermore, as will be discussed later herein, the clusters may be disposed at one local site or may be dispersed among geographically remote locations. Note that although FIG. 2 shows an intelligent director agent for each of these stages, it is contemplated that in some clustered computer systems, not every stage needs to be provided with an intelligent director agent and that significant benefits may be achieved by endowing even only one of the stages with one or more intelligent director agents. Conversely, a stage may comprise multiple clusters, in which case multiple IDAs may be provided.

With reference to FIG. 2, there is shown a clustered computer system 202, which is typically connected to a larger network such as the Internet or a portion thereof. Clustered computer system 202 includes a webserver stage 204, and business logic stage 206, and a data repository stage 208.

Data repository stage 208 represents the stage wherein data for use by the business logic software modules are kept and includes the data stores as well as the database logic employed to access the data stores. Business logic stage 206 represents the stage wherein the computer cluster(s) employed to execute the business logic software modules is implemented. For simplicity, only one cluster comprising four business logic servers is shown in FIG. 2. Webserver stage 204 represents the stage wherein the computer cluster (s) employed to execute the webserver logic is implemented. Webserver stage 204 generally facilitates the users' interaction with the rest of clustered computer system 202 using the web-based paradigm or a suitable paradigm for interacting with the Internet. Again, only one cluster comprising five webservers is shown in FIG. 2 to simplify the illustration.

In the case of FIG. 2, the servers within each stage and within each cluster may be heterogeneous (i.e., implemented on different platforms and having different capability) and each may operate a different set of business logic modules, i.e., application software modules. By way of example, servers 216, 218, 220 and 222 within business logic stage 206 may be implemented using different hardware/software platforms and configurations that are adapted for operating the business logic software modules implemented therein. In other words, there is no requirement in the present invention that the servers associated with a given stage or cluster or even those running copies of a particular software module be homogeneous (although such can be readily accommodated by the instant clustered computer system architecture without any major modification, as can be appreciated by those skilled in the art after reading this disclosure). As long as the servers in a cluster can communicate with the IDA that is associated with that cluster and can be adapted to operate cooperatively with one another within a cluster, they can be implemented in the cluster architecture of the present invention. It should be noted that the technologies, protocols, and methodologies exist for allowing heterogeneous computers to communicate and work cooperatively and will not be discussed in greater detail herein. Further, the specific technologies employed to enable the heterogeneous computers to communicate and work cooperatively are somewhat irrelevant to the central purpose of the present invention, which is to improve scalability and efficiency for a clustered computer system that is capable of employing both heterogeneous and homogeneous clusters. As will be discussed later herein, the additional information kept by the IDAs pertaining to the software modules and the servers that implement them renders the implementation of heterogeneous clusters within each stage possible while facilitating improved access speed for the users and reliability for the clustered computer system.

Beginning with the user's access request via path 210 (by, for example, typing in the Uniform Resource Locator or URL at the user's web browser), the request is forwarded to a webserver logic intelligent director agent (IDA) 212, which decides among the webservers 214(a)–214(e) as to which of these webservers should service this user's access request. As a threshold determination, webserver logic IDA 212 may ascertain whether the user had recently accessed the service through a particular webserver of webserver stage 204. If he did, there may be data pertaining to this user that is cached at the webserver that last serviced him, and it may be more efficient to continue assigning this user to that webserver to take advantage of the cached data.

On the other hand, if it is determined that this user has not recently accessed the service or if there is no cached data pertaining to this user on any of the webservers, webserver logic IDA 212 may assign the user to one of webservers 214a–214e. As in the prior art, the decision of which webserver to assign may be made based on the current relative load levels on the respective webservers, the information pertaining to which is periodically received by webserver logic IDA 212 from the webservers through path 232. Additionally, however, webserver logic IDA 212 also receives additional information pertaining to the webservers and the webserver logic software modules implemented on the webservers to facilitate improved access speed and reliability. Thus, the webserver logic IDA 212 arbitrates among the webserver computers based not only on the relative load level information associated with the individual webservers but also based on information pertaining to the individual webserver logic software modules. For brevity sake, this aspect of the invention will be discussed in greater detail in the analogous discussion made in connection with the business logic IDA later herein.

The assigned webserver may then authenticate the user to ascertain whether the user is registered and/or properly authorized to use the service offered through clustered computer system 202. After successful authentication, if the user subsequently indicates that he wishes to employ a particular business logic software (by, for example, inputting data or taking an action that requires the attention of a particular business logic module), the webserver assigned to him then accesses a business logic IDA 240 to ascertain the appropriate business logic server (i.e., the appropriate server in the business logic stage such as one of business logic servers 2216, 218, 220 or 222) to which the user's transaction request may be sent.

As in the prior art, the decision pertaining to which business logic server to assign may be made based on the current relative load levels on the respective business logic servers, the information pertaining to which is periodically received by business logic IDA 240 from the business logic servers through path 242. Additionally, however, business logic IDA 240 also receives additional information pertaining to the business logic servers and more importantly the business logic software modules implemented on the business logic servers to facilitate improved access speed and reliability. Accordingly, the routing decision taken by the business logic IDA is based not only on information pertaining to the individual business logic servers but also based on information pertaining to the individual business logic software modules implemented thereon.

As will be discussed later herein, the availability of the additional business logic server-specific information and the business logic module-specific information also facilitates inventive techniques to improve access speed and reliability during software upgrades, to maintain a desired level of fault tolerance for the business logic software and/or the business logic servers, to reactively and/or prospective load balance among the business logic servers, and to efficiently employ remote business logic servers to accomplish improving access speed and reliability. Some of the additional data kept by the business logic IDA and their roles in improving access speed and reliability in accordance with embodiments of the present invention will be discussed later herein.

To clarify, a business logic software refers to a business logic program. A business logic module refers to a copy of the business logic software. The servers of a cluster may implement many different business logic software programs. Each of these business logic software programs has many copies distributed among the servers of the cluster to facilitate redundancy and scalability.

Once a business logic server having thereon the requisite business logic module to service the user's transaction request is assigned to service the incoming transaction request, subsequent traffic between the webserver assigned earlier to that user and the assigned business logic server may be (but is not required to be) transmitted directly without going through the assigned business logic IDA.

If the business logic module employed by the user requires data from data repository stage 208, the business logic software module, through the business logic server, may consult yet another IDA (shown in FIG. 2 as database logic IDA 250), which picks the most suitable database server 252, 254, and/or 256 for serving up the data. As in the prior art, the decision regarding which database server to assign may be made based on the current relative load level on the respective database servers that have the necessary data, the information pertaining to which is periodically received by database logic intelligent director agent 250 from the database servers through path 260. Like the business logic IDA and the webserver IDA, however, the database logic IDA 250 also receives additional information pertaining to the database servers as well as the database server logic modules implemented on the database servers to facilitate improved access speed and reliability. For brevity sake, this aspect of the invention in connection with the database logic IDA will be discussed in greater detail in the analogous discussion made in connection with the business logic IDA later herein. Once a database server having thereon the requisite data to service the user's transaction request is assigned, subsequent traffic between the business logic server that requests the data and the assigned database server may be (but is not required to be) transmitted directly without going through the assigning database logic IDA.

In one embodiment, an IDA may be co-located with the router that routes the traffic to the servers of the cluster, or it may be implemented separately from the router. It should be kept in mind that although FIG. 2 shows an IDA for each of the webserver stage, the business logic stage, and the data repository state, there is no requirement that there must be an IDA for each stage, or each cluster for that matter if there are multiple clusters per stage. The provision of an IDA, even with only one cluster or one stage of the clustered computer system, dramatically improves access speed and reliability even when other clusters and stages may be implemented without IDAs.

As mentioned earlier, an intelligent directory agent (IDA) receives more than just load status data from the servers it services. With reference to business logic intelligent director agent (IDA) 240, for example, it is preferable that the business logic IDA tracks one or more of the additional information such as server processing capability, server geographic identification (e.g., remote or local to the site that implements the webserver stage and/or the data repository stage), the average latency for servicing a transaction request (e.g., due to the server's geographic remoteness or the speed of the network connection), the list of business logic modules that are compatible with each server, the list of the business logic modules actually implemented on each server, the version of the business logic modules implemented, and/or the load experienced by the business logic modules on the servers. In one embodiment, the business logic IDA also receives information pertaining to external historical profiles (268) of transaction requests and processing loads on the business logic modules and/or the business logic servers in order to predict usage demands placed on the business logic modules and to prospectively balance the loads among the business logic servers if needed so that an anticipated surge in usage does not overwhelm any particular business logic module.

Figure 3:
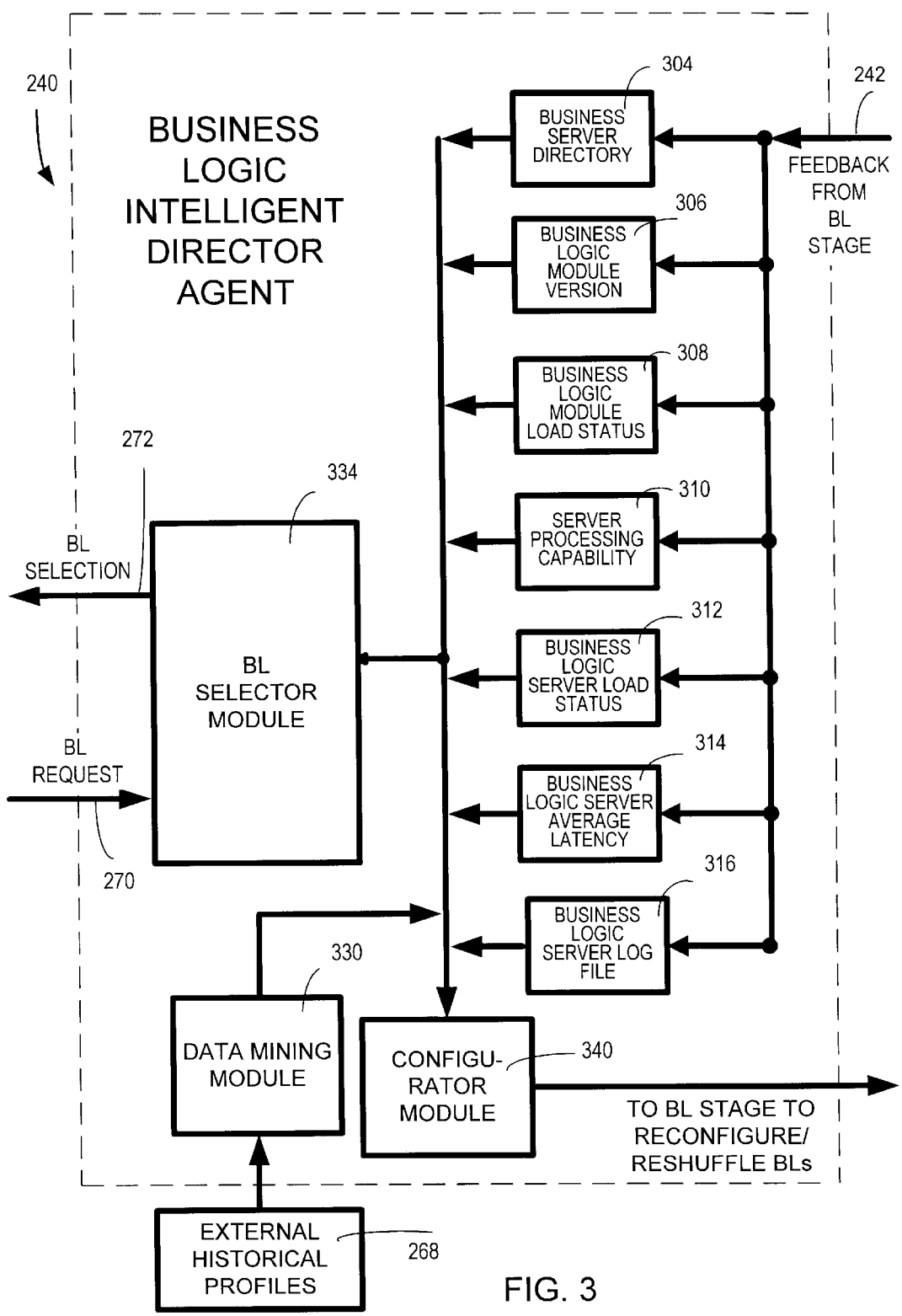
FIG. 3 illustrates, in accordance with one embodiment of the present invention, a simplified logic block diagram of an exemplary business logic intelligent director agent (IDA).

FIG. 3 illustrates, in accordance with one embodiment of the present invention, a simplified logic block diagram of an exemplary business logic intelligent director agent (IDA) 240. Although only the business logic IDA is described in details herein, the webserver logic IDA and the database logic IDA may be similarly formed. However, their similar construction will not be discussed in details for brevity sake. With reference to FIG. 3, business logic requests from the webservers are received by business logic IDA 240 via path 270. Within business logic intelligent director agent 240, both server-specific and software-specific information is received and maintained in addition to the relative load status on individual business logic servers.

Some of the additional pieces of information are received from the business logic servers via path 242 and stored in exemplary blocks 304, 306, 308, 310, 312, 314, and 316 respectively. For ease of illustration, not every piece of information is shown in FIG. 3. Note that some of information is static and may be received as part of the registration process that the servers underwent as they were installed into the cluster. Examples of such static information includes server processing capability and business logic module version number. Other information may be dynamically received by the IDA from the servers (such as the list of business logic modules implemented on each server) and other network monitoring tools (such as conventional software tools that track network congestion at specific locations). Still, other information may be derived from the information received dynamically and/or statically (such as the average latency time for servers, which may be calculated periodically based on average network latency between the webserver and the business logic server, the average network latency between the business logic server and the available database cluster, the processing capability of the servers, and the like).

Business server directory 304 may track information pertaining to the list of business logic servers available to the clustered computer system, their remote/local status, their certified/uncertified status (which may be expressed as Boolean values or may be a numerical value that reflects their preference in receiving and servicing transaction requests), the list of business logic servers capable of being loaded with a particular business logic software, the list of business logic servers capable of being used for running a particular business logic module, their relative weight which reflects the relative preference with which traffic should be directed to the individual servers (e.g., due to network conditions or other factors), and the like.

Business logic module version block 306 may track information pertaining to the software versions of the business logic modules implemented on the various business logic servers. Further, business logic version block 306 may track information pertaining to the certified/uncertified status of each copy of the business logic modules, the relative weight of each copy of business logic module which reflects the relative preference with which traffic should be directed to it, and the like.

Business logic module load status block 308 may track information pertaining to the level of load currently experienced by the individual business logic modules (in number of transactions per second or the number of users currently using a business logic module, for example). This information may be tracked for business logic modules currently in operation, individually and/or as a group average.

Server processing capacity block 310 may track the processing capability (again in number of transactions per second or the number users that can be supported concurrently) of the individual business logic servers in order to ascertain how much bandwidth a particular server may have, how much has been used, and how much is available.

Business logic server load status block 312 may track a similar type of data as business logic module load status, albeit at the server level instead of the business logic module level. Business logic server average latency block 314 may track the average latency to be expected if a particular business logic server is employed to service the transaction request. The average latency may be calculated based on the processing capability of the server, how remote it is from the webserver that issues the transaction request (which is impacted by network latency), how remote it is from the database that may be needed to service the transaction request (which is also impacted by network latency). Business logic server log file block 316 may track the operational status of the business logic server and/or the business logic modules implemented thereon to determine, for example, the length of time that the server and/or the business logic module has been in operation without failure and other types of log file data.

Business logic intelligent director agent 240 also includes a data mining module 330, which receives the external historical profiles (268 of FIG. 2) of past usage trends on the various business logic modules and/or business logic servers, and ascertains prospectively the load demand on the various business logic modules and/or business logic servers. Data mining module 330 may be implemented using a variety of available data mining methodologies. Implementations of data mining is further discussed in the aforementioned data-mining related applications, which are incorporated herein by reference.

Using the server-specific and the business logic module-specific information available, a business logic selector module 334 then selects one of the business logic servers to service the pending business logic request and transmits the selection to the requesting webserver via path 272.

Within business logic intelligent director agent 240, there is also shown a configurator module 340, representing the module that either reactively or prospectively reconfigures and/or reshuffles the business logic modules among the business logic servers to permit the clustered computer system to better handle the processing load and to achieve the desired level of fault tolerance. These aspects of the present invention are discussed later in connection with the flowcharts herein.

In the figures and discussion that follow, novel and advantageous techniques for improving transaction request service speed and/or reliability of the clustered computer system are discussed in greater detail. In one embodiment, the reliability and service quality risks associated with software upgrade operations (which include updating the version of a business logic module in operation and/or introducing copies of a new business logic module into the cluster) are vastly reduced by allowing the copies of the new business logic module to be gradually phased in on only a percentage of the servers that eventually need to be upgraded. In the case of software version upgrade, at least a number of copies of the older version of the business logic module being upgraded are preferably kept unchanged to continue to service transaction requests in the interim. After copies of the new business logic module are loaded on a percentage of the servers that need to be upgraded, their load levels are increased gradually, either incrementally in stages or smoothly over time, until their operation log files indicate that they or the servers on which they are implemented have passed some predefined reliability criteria (which may be set in term of the number of hours of continuous operation, the number of users supported concurrently, a combination thereof, or the like). Once these copies of the business logic module to be loaded are certified as reliable, another set of copies of the business logic module to be loaded may be loaded onto another group of servers until all servers that need to be upgraded are loaded with the new version of the business logic module. In this manner, the phase in is done with respect to both the number of servers affected (which are loaded with copies of the new software in groups over time instead of all at once) and in the gradual increase in the level of load on the servers undergoing certification.

The number of servers to be loaded at any given in time is preferably chosen so that if they, as a group, fail, the remaining servers are adequate to handle the existing load without undue impact to the users (i.e., without undue degradation in performance). As will be explained in detail herein, the use of remote business logic servers may allow a greater number of servers of a particular cluster to be loaded at once since the remote business logic servers may be able to serve as redundant servers to handle the stream of transaction requests should the servers currently undergoing certification fail.

In a software loading operation in which a new business logic module is loaded onto servers of the cluster for the first time, the number of servers to be loaded with copies of a new business logic module may be determined based on the expected level of usage of the business logic module and the processing capability of the servers of the clusters, among other factors. If the load is expected to be high, more servers may be loaded with copies of the new business logic module. On the other hand, if the processing capability of the servers to be loaded is fairly high, the number of servers required may be reduced since each copy may support a greater number of concurrent users.

Figure 4:
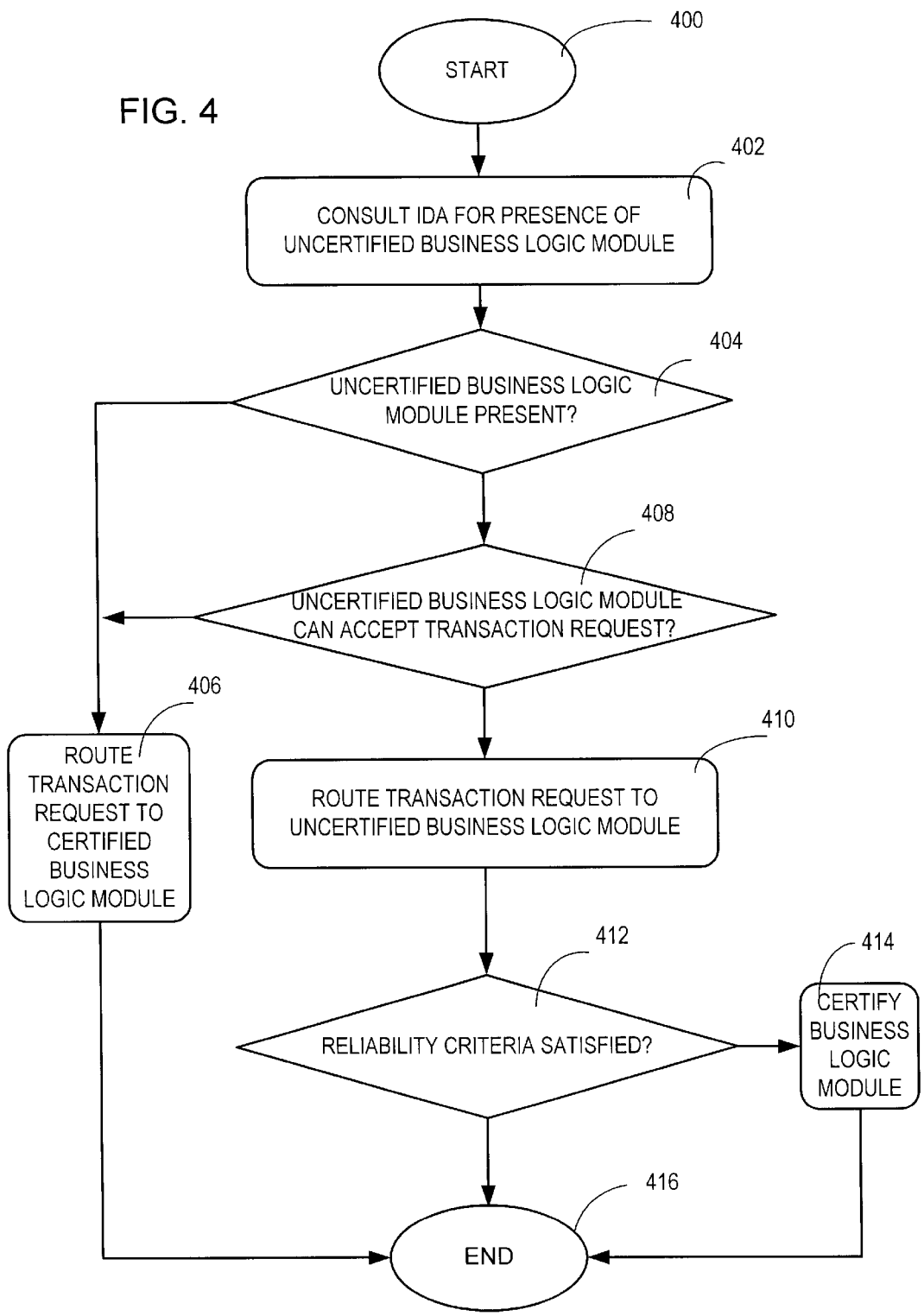
FIG. 4 illustrates, in accordance with one embodiment of the present invention, a flowchart illustrating the steps employed to perform the software upgrade in a manner so as to improve the reliability of the clustered computer system.

FIG. 4 illustrates, in accordance with one embodiment of the present invention, a flowchart illustrating the steps employed to perform the software upgrade in a manner so as to improve the reliability of the clustered computer system.

In contrast to the prior art technique of performing software upgrade, the invention preferably upgrades only a percentage of the number of servers that need upgrading in the cluster at any given time. As the new business logic modules are initially loaded, they are deemed uncertified until they pass some reliability criteria. During certification, user transaction requests are routed to both the certified business logic modules (the old but proven copies of the business logic software) and the new business logic modules. A routing function ensures that the traffic load on the uncertified business logic modules are brought up gradually. When the uncertified business logic modules pass some reliability criteria, they become certified and another set of old business logic modules can be replaced (or another set of servers can be loaded) in a similar manner.

In step 402, as user transaction requests are received at the cluster, the intelligent director agent is consulted to determine whether there exists an uncertified business logic module in the cluster. In the context of software upgrade/loading, a business logic module may be flagged as uncertified if it is a new, unproven copy of a business logic software on a server and/or an existing business logic module that is implemented on a server which happens to also be loaded with another business logic module undergoing certification. The latter situation may also present a reliability risk since the entire server may crash (due to e.g., conflict with the newly loaded business logic module). In this latter situation, all business logic modules on that server may be deemed uncertified, even if the newly loaded business logic module is unconnected with the incoming transaction request and the particular business logic module needed to service the incoming transaction request has not been changed on this server. The presence of one or more uncertified business logic modules in the cluster signals that a software upgrade operation is under way.

With reference to FIG. 2, for example, IDA 240 is consulted to determine whether there exists any uncertified business logic module on any of servers 216, 218, 220, and 222. If no uncertified business logic module is found in the servers of the cluster (step 404), the method proceeds to route the incoming transaction request (or the user) to one of the certified business logic modules using a conventional routing methodology (such as round robin, based on the relative load levels, and the like). This routing step is shown in step 406 of FIG. 4.

On the other hand, if consultation of the intelligent director agent associated with the cluster reveals that there is one or more uncertified business logic modules implementing the requested business logic software present, the method proceeds to step 408 wherein a routing function is ascertained to determine whether one of the uncertified business logic modules should service the incoming transaction request.

In general, the routing function is configured to increase the load level of the uncertified business logic module in a gradual manner. By way of example, the uncertified business logic module may be brought up to capacity gradually over time, or to some predefined threshold initially, allowed to level off for a period of time to assure that the uncertified business logic module can function satisfactorily at that threshold level before that uncertified business logic module is permitted to receive additional loads. In the course of certifying an uncertified business logic module, multiple threshold levels may be involved. As can be appreciated by those skilled in the art, as long as the routing function allows the uncertified business logic module to be brought on line gradually, the specific mathematical construct of the routing function may vary widely depending on need and preference.

If the routing function suggests that the uncertified business logic modules should handle the incoming transaction request, the incoming transaction request is then routed to one of the uncertified business logic modules to handle in step 410. In one embodiment, since the IDA also has available to it performance data pertaining to the individual servers, the IDA may intelligently route the incoming transaction request to a specific uncertified business logic module that can service the transaction request in the most timely manner among all uncertified business logic modules. Additionally and/or alternatively, all uncertified business logic modules may be loaded with transaction requests gradually and equally so as to minimize the impact on the whole clustered computer system if any random module fails. By way of example, if one of the servers implementing the uncertified business logic modules is particularly powerful, it may be wise to avoid allowing that powerful server to handle a high percentage of the transaction requests to lessen the adverse impact in the event of failure by that server.

In a particularly advantageous embodiment of the present invention, the adverse impact of one or more server crashing during certification may be reduced even further by staging the number of servers simultaneously undergoing certification such that initially, only a very small number (e.g., 1 or only a few) is first allowed to undergo certification. For subsequent groups of servers undergoing certification, their number may be allowed to increase such that a greater number of servers concurrently undergoing certification may be allowed. With this technique, initial crashes may be experienced by only a small percentage of the servers. As time goes by and more problems are identified and addressed, the crashes are typically less frequent and a greater number of servers may be allowed to undergo certification concurrently. In this manner, the risk of service disruption is advantageously kept low.

The risk of service disruption may be further reduced by installing the uncertified business logic modules only on servers other than those originally existing in the cluster. The servers to be loaded with the uncertified business logic modules in this case may be new servers that are installed locally with the cluster or servers that are remote to the cluster but are registered with the local IDA for receiving and servicing transaction requests for the purpose of providing redundancy during software upgrade. Alternatively or additionally, the remote servers may run the old, certified modules to provide redundancy while the uncertified modules are loaded onto the existing local servers to leave the capacity attributable to the certified business logic module substantially unchanged. Thus, if one or even all of the servers undergoing certification crash, there would be little impact since the certified modules are still available to the cluster to service the transaction requests. To eliminate impact even on the transaction requests handled by the failed servers prior to their crashing, the transaction requests routed to the uncertified copies may be executed concurrently on a certified copy or cached to allow seamless recovery in the event of a crash.

In step 412, the method ascertains whether the uncertified business logic module has passed some predefined reliability criteria. The reliability criteria may be ascertained from reviewing the log file associated with the uncertified business logic module and/or the server undergoing certification (e.g., by consulting business logic server log file block 316 of FIG. 3, for example). If the reliability criteria is satisfied, the uncertified business logic module may have its status changed to certified in step 414. Thereafter, the steps of FIG. 4 end at step 416.

Figure 5:
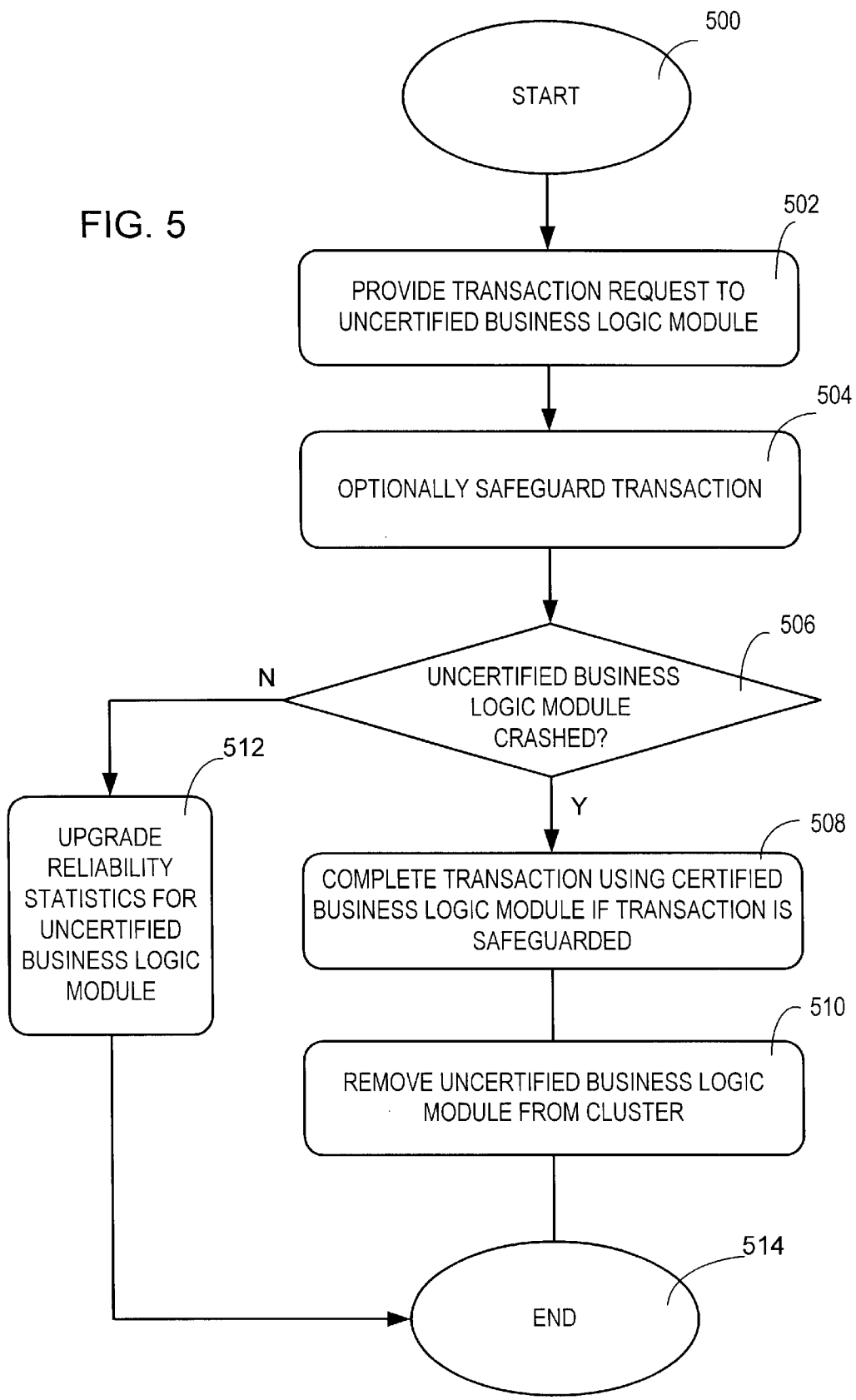
FIG. 5 illustrates in detail, in accordance with one embodiment of the present invention, the step of routing the transaction request to the uncertified business logic module to handle.

FIG. 5 illustrates, in accordance with one embodiment of the present invention, step 410 of FIG. 4 (routing the transaction request to the uncertified business logic module to handle) in greater detail. In step 502, the transaction request is forwarded to the uncertified business logic module. In step 504, the transaction being performed is optionally safeguarded by additionally caching the transaction request data or by running the request concurrently on one of the certified business logic modules, which may be local or remote. If the uncertified business logic module or the server on which it is implemented crashes (step 506), the transaction request currently underway may be completed by the certified business logic that runs the transaction concurrently or the transaction may be executed again using the cached data pertaining to the transaction using another certified business logic module. This is shown in step 508. Thereafter, the uncertified business logic module that failed is removed from the cluster (step 510) and its status may be updated accordingly with the business logic IDA.

On the other hand, if the uncertified business logic module is able to complete the transaction, its reliability indicator is upgraded (by, for example, upgrading the operation log file of the uncertified business logic module (step 512)). Of course if the uncertified business logic module is able to complete the transaction, there may be no need to complete the transaction request by the redundant certified business logic module since only one business logic module should complete servicing the transaction request by the user. In some cases, a preference rule may be set such that the transaction is always completed by the uncertified business logic module if no crashing occurs to simulate as closely as possible the conditions that the uncertified business logic module will experience once it becomes certified. On the other hand, another preference rule may dictate that the certified business logic module always complete the transaction during the software upgrade period so as to minimize any impact on customer service and system reliability if the uncertified business logic module fails, since the uncertified business logic modules are not relied on to complete the transactions anyway.

In the e-commerce application, it is expected that the business logic modules may be dynamically reshuffled among the servers of the cluster, may be upgraded by the e-commerce service and/or its partners, and may be implemented on a variety of heterogeneous servers all having different capabilities and mix of business logic modules. Accordingly, at any given time, some of the business logic modules may be in the process of being upgraded or some of the resources they may need (such as the local database) may be temporarily unavailable due to maintenance/upgrade. Further, some business logic modules may be implemented on servers that are more powerful than others, and some may be off-site at a remote location. All these activities impact the response time for transaction requests and need to be dynamically accounted for in order to minimize the wait time for customers of the e-commerce site.

In accordance with one embodiment of the present invention, the routing of traffic (either all transaction requests pertaining to a user or discrete transaction requests) is made more efficient utilizing the additional information pertaining to the business logic modules and business logic servers that are tracked by the IDAs. In contrast to prior art routing techniques which depend primarily on the relative load levels on the servers, the IDA of the present invention further employs, among others, information pertaining to the processing capacity of the servers, the certified/uncertified status of the business logic modules, and the average latency of the servers on which the requisite business logic modules are implemented, in order to make its routing decision.

Information pertaining to the processing capacity of the servers may powerfully impact the routing decision since a more powerful server may be able to process a transaction request faster than a less powerful server even if the more powerful server may appear to be more heavily loaded. With reference to FIG. 3, The server processing capability is tracked by the business logic IDA (as well as other IDAs for their clusters) in block 310. The server processing capability may be obtained when the server is first installed and registered with the IDA.

The certified/uncertified status of the business logic modules may impact the ability of a business logic module to accept transaction requests since, as mentioned earlier, a routing function may limit the speed at which the load on an uncertified business logic module is ramped up after software upgrade. The certified/uncertified status may be registered by the business logic module undergoing certification or by the server for all the business logic modules implemented on that server if one of the business logic modules currently undergoes certification and poses a reliability risk to the server. This is because, as mentioned, even if the business logic module being requested has not been upgraded recently, another business logic module on its server may have been upgraded or loaded recently, which affects the reliability risk of that server as well as all business logic modules implemented thereon. When a business logic module is labeled as uncertified, it may be deemed less preferred for servicing transaction requests by a routing function.

The geographic distribution of the clusters and servers may also impact routing decisions. Nowadays, it is common to find servers of a given e-commerce service widely dispersed over a large geographic area, both to improve service to its worldwide customer base and also to provide some measure of protection against natural or man-made catastrophes that may impact a given geographic location. In general, it is desired that transaction requests originated from a given locality be serviced by business logic servers that are closest to the place of origination. However, there are times when local processing resources may not be adequate and remote servers need to be employed in order to reduce the transaction request processing times. By way of example, if a significant number of business logic modules are undergoing certification, the available resources of a particular local cluster for servicing transaction requests may be reduced. Further, if the local database resources that the local servers need to service transaction requests are temporarily unavailable or overloaded, the delay may be less if remote servers are called upon to service the transaction requests originated locally, particularly if the remote servers have ready and quick access to the needed database resource at the remote site. The business logic server average latency is kept by block 314 of FIG. 3, for example. Still further, since the servers are interconnected with one another and with other components of the clustered computer system using networking technologies, network congestion at specific locations may unduly increase the time required to process a transaction request. Due to network latency, it may be possible to reduce the transaction request service time by routing the transaction request to a remote server for servicing.

Figure 6:
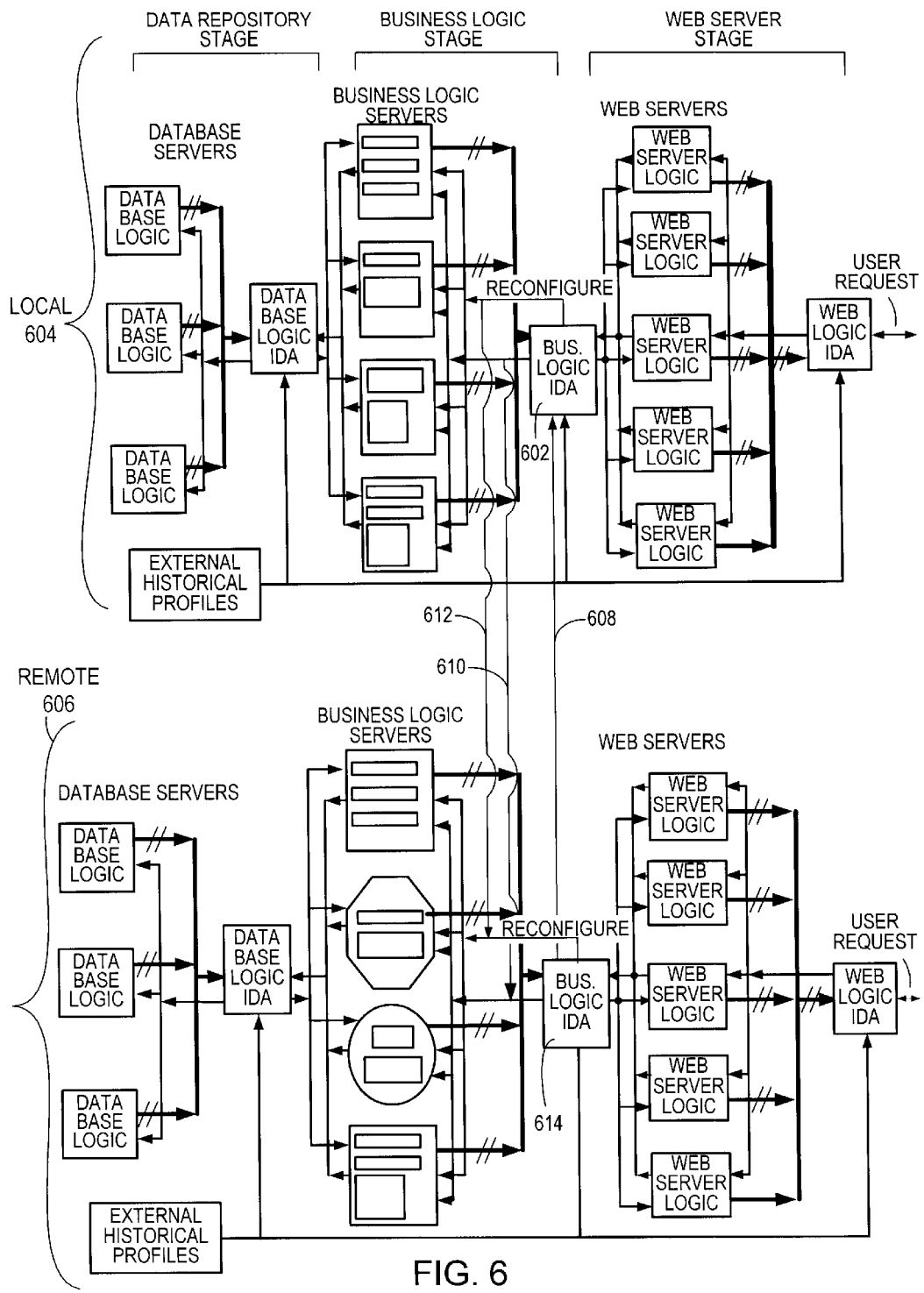
FIG. 6 illustrates, in accordance with one embodiment of the present invention, a clustered computer system architecture that includes both a remote site and a local site, and the IDA's therefor.

FIG. 6 illustrates, in accordance with one embodiment of the present invention, a clustered computer system architecture wherein a business logic IDA 602 of a local site 604 receives feedback data from both the business logic servers/business logic modules of a remote site 606 (via a connection 608) and business logic servers/business logic modules of local site 604 so that it can, through connection 610, direct traffic to the business logic servers of the remote site. Network traffic data pertaining to specific connections within and between the various sites may be obtained through the use of appropriate network sniffers or other software tools and furnished to the business logic IDA 602 of local site 604 so that the appropriate calculation pertaining to average latency can be made. A connection 612 is also shown, indicating that business logic IDA 602 is also capable of directing the business logic servers of remote site 606 to reconfigure themselves to achieve load balancing and fault tolerance. In embodiments if the present invention, one or both of the routing and the reconfiguration connections from one site to another may also be made between IDA's. Reconfiguration of the business logic modules to achieve load balancing and fault tolerance is discussed in detail later herein.

For simplicity's sake, the connections that facilitate routing and reconfiguration of the business logic servers/business logic modules of local site 604 by business logic IDA 614 of remote site 606 are also not shown. Likewise, the reverse connections that allow business logic IDA 614 of remote site 606 to track information pertaining to the business logic servers/business logic modules of local site 604 are not shown in FIG. 6. Further, similar connections between the servers and IDAs of the web server stage and the data repository stages of the various sites are also not shown in order to simplify the illustration. Additionally, more than one remote site may be present. However, the details pertaining to these connections should be readily apparent to the artisan given the disclosure above.

Figure 7:
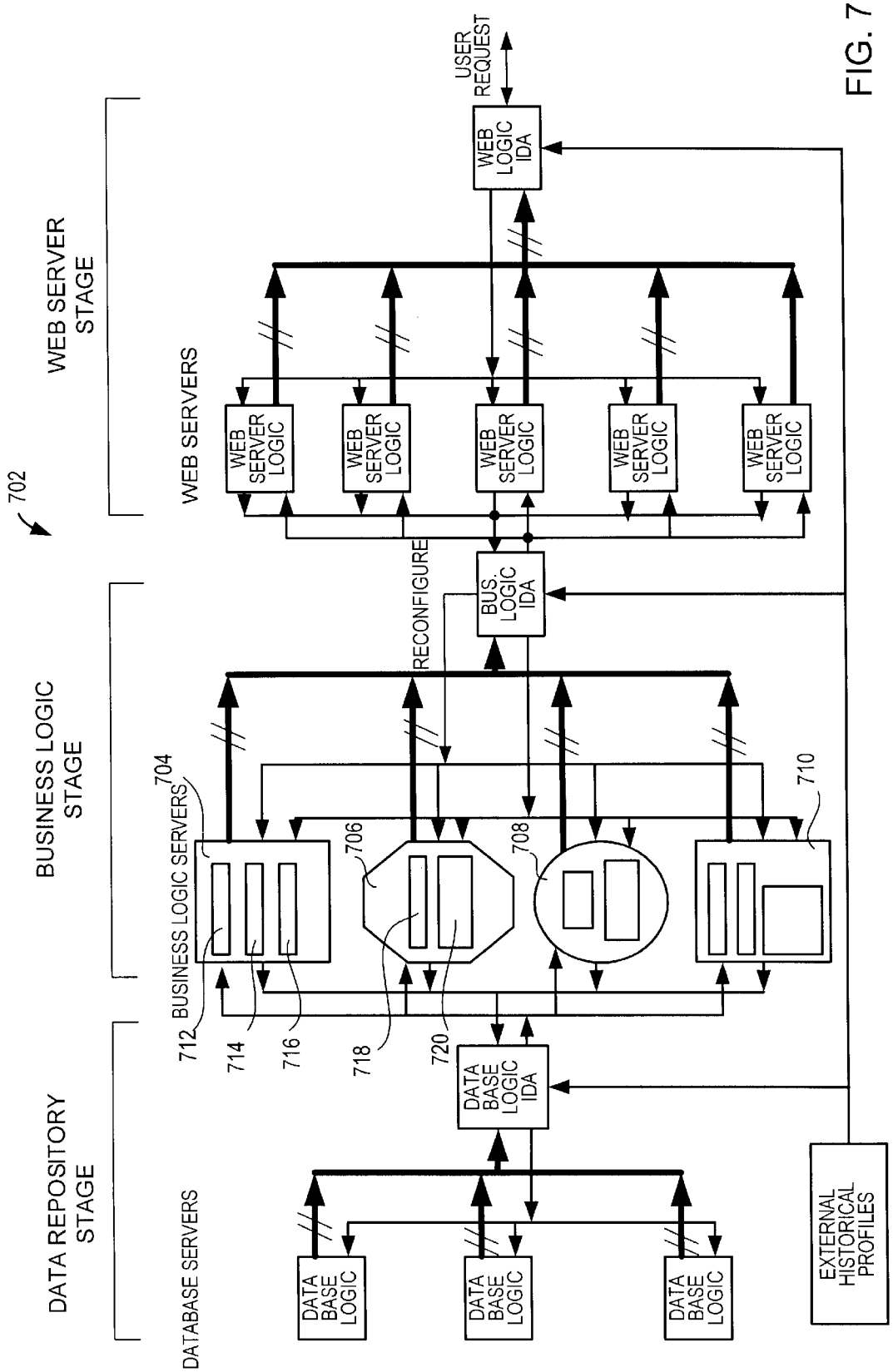
FIG. 7 illustrates, in accordance with one embodiment of the present invention, a clustered computer system having a business logic stage which comprises a cluster of heterogeneous computers

As mentioned earlier, the desire to employ heterogeneous clusters in order to leverage on the base of preexisting business logic software programs renders it difficult for the prior art to implement fault tolerance in the clusters. To facilitate discussion, FIG. 7 illustrates, in accordance with one embodiment of the present invention, a clustered computer system 702 having a business logic stage which comprises a cluster of heterogeneous computers, as indicated by their diverse shapes to symbolically indicate that servers 704, 706, 708, and 710 may be implemented by computers running on different hardware and operating systems. This is typically the case when the servers are chosen for their compatibility with the business logic modules therein (e.g., business logic modules 712, 714, 716 in business logic server 704 or business logic modules 718 and 720 in business logic server 706 to allow the e-commerce site to take advantage of the existing base of business logic software instead of being forced to choose only among those compatible with a given platform, as in the case with the homogeneous cluster approach). As mentioned, the technologies, protocols, and methodologies exist for allowing heterogeneous computers to communicate and work cooperatively and will not be discussed in greater detail herein.

In accordance with one embodiment of the present invention, as long as the business logic servers can communicate its status and the status of its business logic modules to the business logic IDA, the IDA can use this information, along with its reconfiguration facility, to reshuffle the business logic modules among the business logic servers to achieve redundancy. Thus, there is no requirement that the business logic servers be homogeneous or even be located in the same site.

Figure 8:
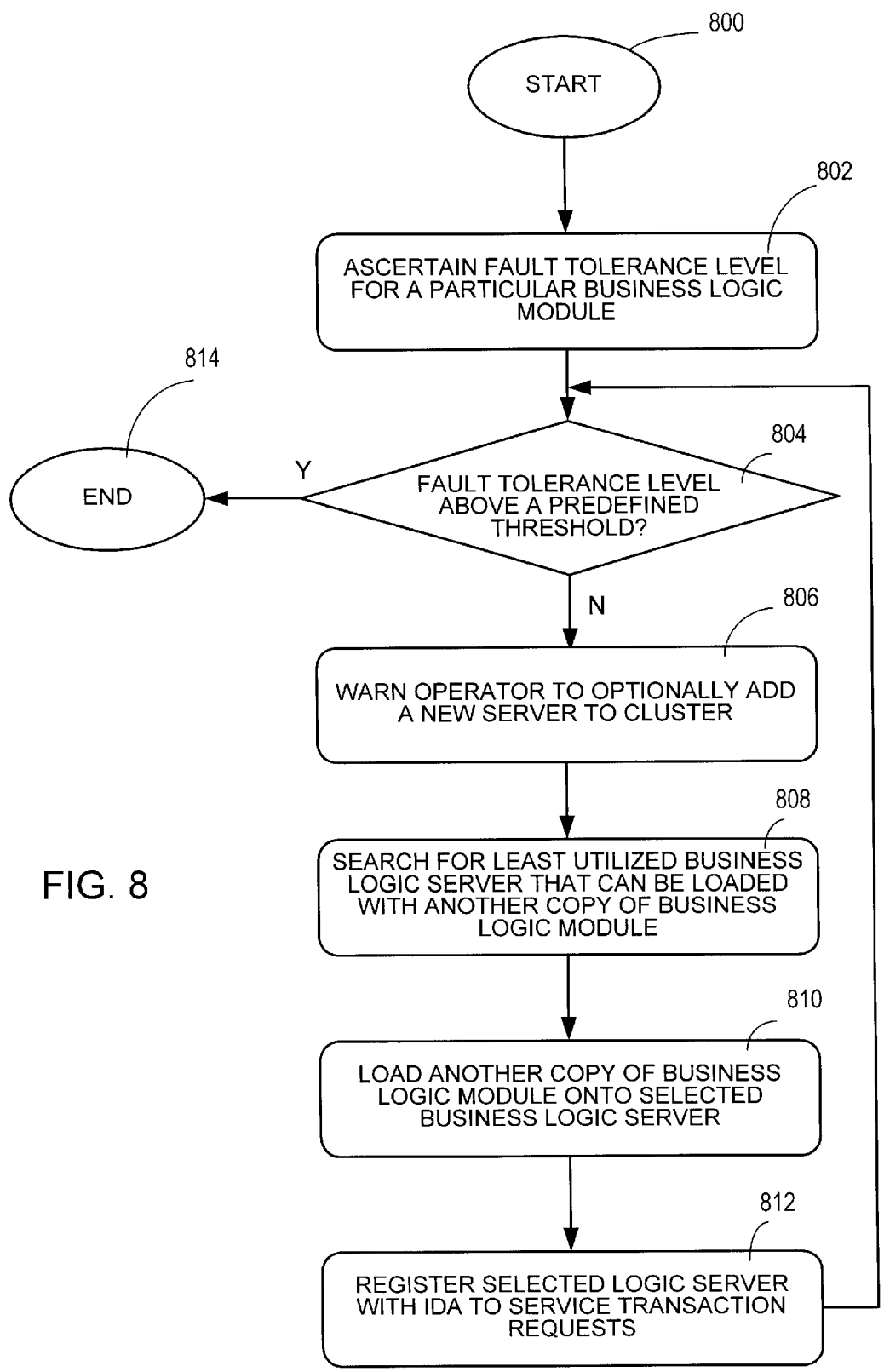
FIG. 8 illustrates, in accordance with one embodiment of the present invention, a flowchart illustrating the steps for maintaining a proper level of fault tolerance for a business logic software.

FIG. 8 illustrates, in accordance with one embodiment of the present invention, a flowchart illustrating the steps for maintaining a proper level of fault tolerance for a business logic software. In contrast to the prior art, fault tolerance may be implemented in the present invention for a business logic software instead of at the server level. This is important in heterogeneous clusters as not all servers have thereon the same copies of Buenos logic software. In step 802, the fault tolerance level for a particular business logic module is ascertained. Typically, this is ascertained by determining the number of servers that have thereon the business logic module in question and compare this number to some predefined fault tolerance threshold number. This information may be obtained by reviewing the list of business logic modules implemented on the various business logic servers of the cluster. Since failure typically occurs at the server level, i.e., a business logic module failure typically affects the entire server or at least all copies of that business logic module on that server, it is generally the number of servers having thereon copies of the business logic software at issue that is material in step 802. In one embodiment, uncertified business logic modules pertaining to a particular business logic software (or servers undergoing maintenance/software upgrade) are not considered sufficiently reliable and may not be counted (or only partially counted) toward the number of business logic modules available to provide fault tolerance.

If the fault tolerance level for the business logic module in question is below a predefined acceptable level (as determined in step 804), the method proceeds to step 806 to warn the system operator and give the operator an opportunity to add additional servers. Additionally or alternatively, additional business logic modules pertaining to the business logic software at issue may be loaded onto existing business logic servers of the cluster (particularly those that did not already have a copy of that business logic module running). However, the addition of a software module, no matter how well tested and proven, always involves reliability risks (due to, for example, software conflicts) and it is typically less risky to employ a server that is new to the cluster so as not to interfere with the other servers already running in the cluster.

If the operator does not respond after a predefined period of time or if the operator affirmatively indicates that no additional server will be added, the method proceeds to step 808 to search for the least utilized server in the cluster (or a powerful server in the local cluster that is relatively lightly loaded) that does not already have a copy of the business logic module at issue loaded. Preferably, the selected server is also one that is known to the IDA to have the ability or compatibility to accept another copy of the business logic software having the inadequate fault tolerance level. Again, this information may be ascertained by reviewing the IDA, e.g., the business logic server directory 304 of FIG. 3. If a new server has recently been added to the cluster in step 806 to address the inadequate fault tolerance condition, the utilization level of the new server is of course about zero in step 808 and if that new server is compatible to receive another copy of the business logic module in question, that new server may be selected. At any rate, one of the existing servers in the cluster that is both least utilized and compatible/able to accept another copy of the business logic module at issue will be selected.

In step 810, another copy of the business logic module pertaining to the business logic software that has the inadequate fault tolerance level is loaded onto the server selected in step 810. The business logic IDA may accomplish this by issuing an appropriate command to the selected business logic server through its reconfiguration facility. In the Internet case, this may include instructing the business logic server to access another computer on the net to retrieve a copy of the business logic module to be loaded and load it. Thereafter, the server that has just been loaded with the business logic module that previously has the inadequate fault tolerance level is registered with the IDA (step 812) to begin accepting transaction requests. In one embodiment, the server that has just been loaded with a copy of the business logic module may be (but not required to be) registered as uncertified and the addition of another copy of this business logic module may be treated as a software upgrade operation to this server to allow the load to be increased gradually in accordance with the software upgrade method described earlier herein.

Figure 9:
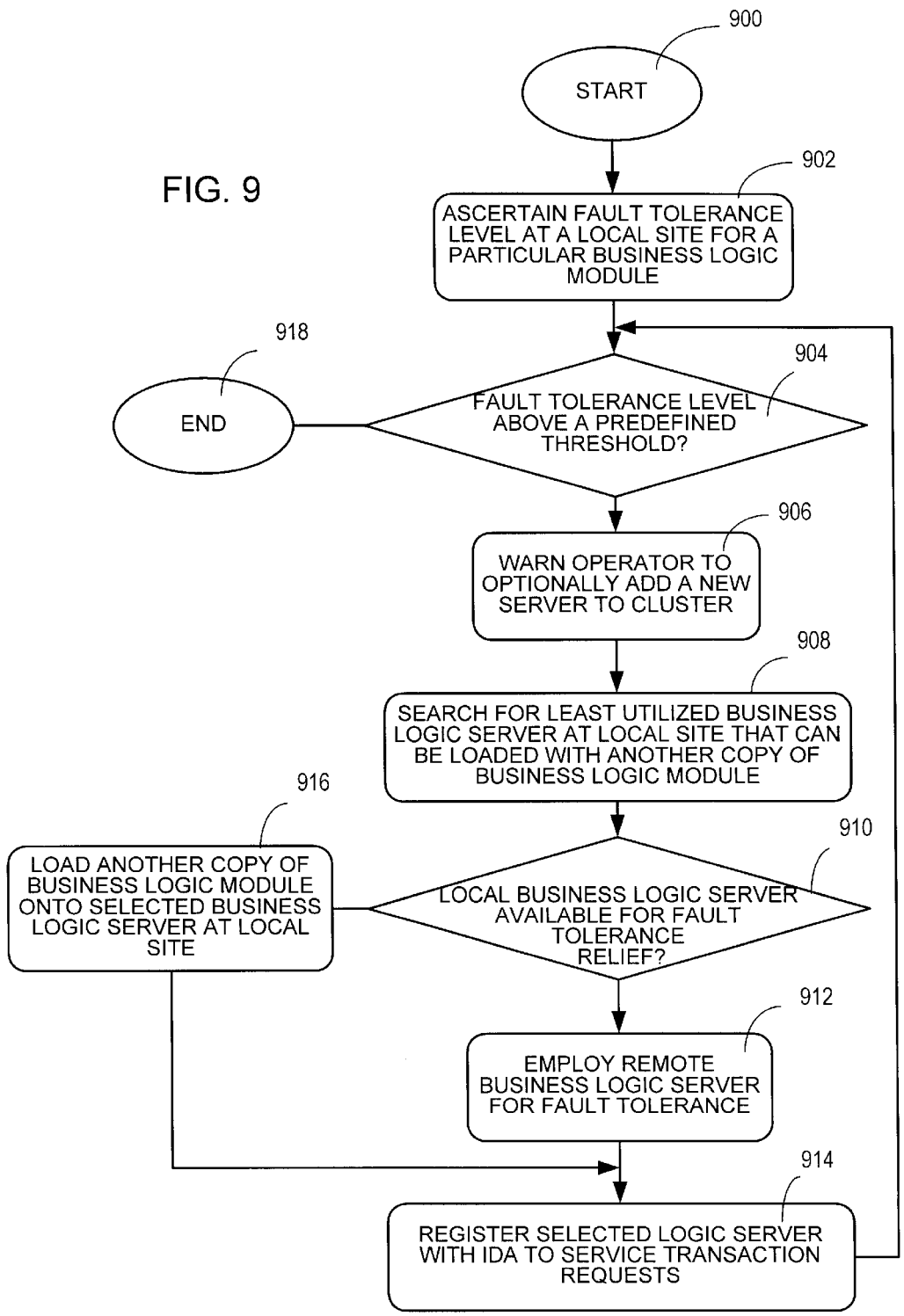
FIG. 9 is a flowchart illustrating, in accordance with one embodiment of the present invention, a method for increasing the fault tolerance level pertaining to a particular business logic software which may also include the use of remote servers.

FIG. 9 is a flowchart illustrating, in accordance with one embodiment of the present invention, a method for increasing the fault tolerance level pertaining to a particular business logic software which may also include the use of remote servers.

As discussed in connection with FIG. 6, the clusters of the clustered computer system may be scattered among different geographically dispersed sites to improve service to geographically dispersed customers and/or to increase survivability in case of a natural/manmade disaster that affects one site. In one embodiment, the business logic servers of a remote site (e.g., remote site 606 of FIG. 6) may be employed to increase the fault tolerance level for a particular business logic software associated with a local site (e.g., local site 604 of FIG. 6).

In step 902, the fault tolerance level for a particular business logic software of a given local site is ascertained. In the context of a multiple-site clustered computer system, this may be ascertained by determining the number of servers at the local site (e.g., local site 604 of FIG. 6) that have thereon copies of the business logic module in question and compare this number to some predefined fault tolerance threshold number. In one embodiment, uncertified business logic modules (or modules implemented on servers undergoing maintenance/software upgrade) are not considered sufficiently reliable and may not be counted (or only partially counted) toward the number of business logic modules available to provide fault tolerance.

If the fault tolerance level for the business logic module in question is below a predefined acceptable level (as determined in step 904), the method proceeds to step 906 to warn the system operator and give the operator an opportunity to add additional servers to the local cluster. Additionally or alternatively, additional copies of the business logic software having the inadequate level of fault tolerance can be loaded onto existing business logic servers of the local cluster (particularly those that did not already have a copy of that business logic software running).

If the operator does not respond after a predefined period of time or if the operator affirmatively indicates that no additional server will be added, the method proceeds to step 908 to search for the least utilized server in the local cluster (or a powerful server in the local cluster that is relatively lightly loaded) that does not already have the business logic module in question loaded. As mentioned earlier, this determination may be made by reviewing information collected at the IDA, such as the list of business logic servers, the list of business logic modules on each server, the load level on the servers, and the like. Preferably, the selected local server is also one that is known to the local IDA to have the ability or compatibility to accept another copy of the business logic having the inadequate fault tolerance level. If there is one or more local server that has the capability (defined as, for example, a minimum processing capability threshold) or compatibility to accept another copy of the business logic software having the inadequate fault tolerance level (as determined in step 910), the method proceeds to step 916 to load another copy of the business logic module onto selected business logic server at the local site.

On the other hand, if there is no local server that has the capability (defined as, for example, a minimum processing capability threshold) or compatibility to accept another copy of the business logic software having the inadequate fault tolerance level, the method proceeds to step 912 to select a business logic server in the remote cluster (e.g., the cluster in the business logic stage of remote site 606 of FIG. 6) to provide fault tolerance for the local cluster. By way of example, a business logic server that already has a copy of the business logic module in question loaded to serve as the redundant business logic server for the local cluster for the purpose of increasing fault tolerance therein. In other words, one or more of the remote servers are now selected to contribute their processing capability to the local cluster to increase fault tolerance.

If there is no business logic server in the remote cluster that already has the business logic module in question loaded, another business logic module at the remote site may still be employed to provide fault tolerance for the local site. To accomplish this, the least utilized server in the remote cluster (or a powerful server in the remote cluster that is relatively lightly loaded) that does not already have the business logic module in question loaded and that is known to the local IDA to have the ability or compatibility to accept another copy of the business logic software having the inadequate fault tolerance level is selected to be loaded with another copy of the business logic software needing the increased level of fault tolerance. Typically, the loading may be accomplished via the local IDA through its reconfiguration facility or through the remote IDA (under instruction from the local IDA). Thereafter, the selected server (either remote or local) having thereon another copy of the business logic software that requires the increased fault tolerance level is registered with the local IDA (step 914) to begin accepting transaction requests. In one embodiment, the newly registered server may be (but not required to be) registered as uncertified to allow the load to be increased gradually in accordance with the software upgrade method described earlier herein. Additionally, if the newly registered server is a remote server, its status may be noted by the IDA so that it is less preferred in the routing of incoming transaction requests at the local site in order to avoid creating network congestion unnecessarily or to avoid the long latency typically associated with using remote servers.

It should be noted that the selection of a business logic server to provide additional fault tolerance protection may also be made by reviewing the load level data, the latency data and/or the processing capability data kept at the business logic IDAs without regard to whether the additional server is "local" or "remote." This may very well be the case if the clusters of the clustered computer system network are connected through reliable, high speed network connections and the geographical distinction may therefore be less important. In this case, the business logic server that is mostly lightly loaded may well be selected to be loaded with another copy of the business logic software needing increased fault tolerance. Alternatively or additionally, a rule may be stated wherein it is more preferable to employ a remote server that already has thereon a copy of the business logic software for the purpose of increasing fault tolerance at the local cluster (provided that the load level and latency are acceptable) than to load another copy of the business logic software onto another local server (since such software loading operation may be deemed in some systems to take too long and/or unduly increase the reliability risk). Other variations exist and they should be within the skills of the artisan given this disclosure.

In accordance with one embodiment of the present invention, the fault tolerance level for a business logic software may be increased prospectively to account for activities or events that may increase the reliability risk. By way of example, software upgrade or software loading operations may heighten the risk of one or more server crashing (and may therefore potentially affect the reliability of the copy being upgraded/loaded/modified and/or any business logic module that is implemented on a server undergoing the reliability risk-affecting activities). This is particularly true if software upgrade and/or maintenance activities are performed on a group of business logic servers and their simultaneous crashing would lead to a catastrophic shortage in the processing capability for one or more of the business logic software even when a "normal" level of fault tolerance exists prior to failure.

As another example, if one or more of the remote servers that are normally relied on for providing possible fault tolerance relief are inoperative (e.g., due to failure at the remote site or on the link between the sites), the fault tolerance level at the local site may be increased just in case fault tolerance relief is needed and the extra capacity is not available in the remote servers. In cases where some event renders the fault tolerance level that normally exists inadequate to protect the system against failure, the fault tolerance level may be increased prospectively over the level normally existing in the absence of such reliability risk-affecting activities. In general, fault tolerance may be raised by either increasing the predefined acceptable fault tolerance level for the business logic software that experiences the heightened reliability risk or by not taking into account (or taking into account only partially) the contribution of the copies of the business logic module at risk in the calculation of available fault tolerance. By way of example, when a server undergoes software upgrade, the copies of the business logic modules implemented thereon may be downgraded (or discounted altogether) in terms of their ability to provide redundancy for fault tolerance purposes.

Since different business logic servers of the cluster may have thereon different sets of business logic modules, there may be times when there is more demand placed on a particular business logic software than others. Thus, even with correct routing, the set of business logic servers having thereon copies of the business logic software in demand will be more heavily loaded than other business logic servers which do not have thereon a copy of the business logic software in demand. In extreme cases, some business logic servers of the cluster may be stressed while other business logic servers may sit idle. Adding additional servers to the cluster to handle the spikes in demand on a particular business logic software, as is done in the prior art, has its disadvantages. As discussed, the addition of a server to a cluster is typically an expensive option and usually involves a substantial delay (during which time transaction request response suffers) and investment in time (since it requires the acquisition, installation, and configuration of new hardware in the existing cluster). Moreover, if such an approach is taken, the number of servers required to handle peak demand for every business logic software implemented in the cluster may be disproportionately large relative to the average processing requirement placed on the cluster since the demands on different business logic modules may fluctuate at different times, and a business logic module that may be idle at one point in time may be heavily used at other times, and vice versa.

Figure 10:
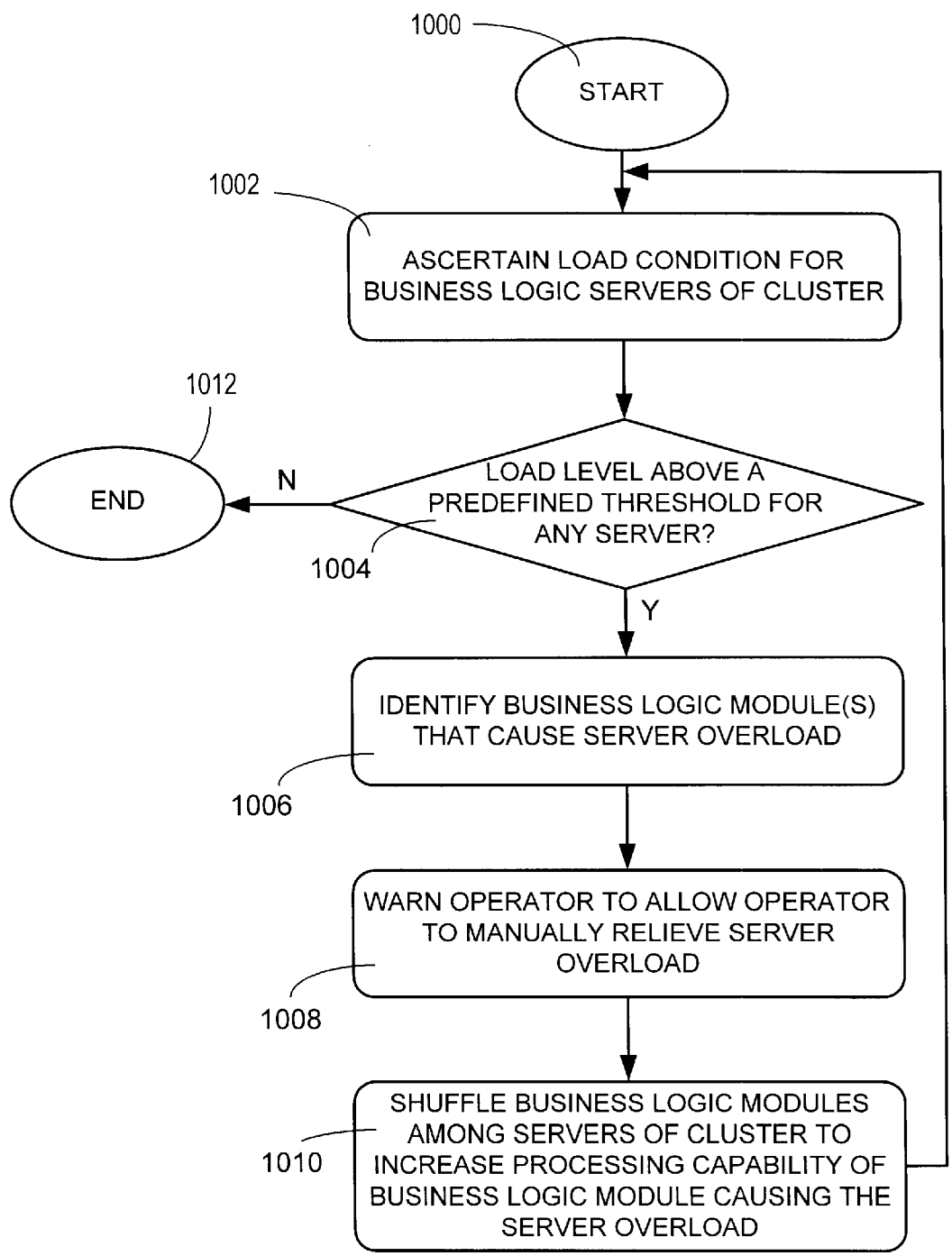
FIG. 10 illustrates, in accordance with one embodiment of the present invention, the steps involved in performing load balancing by shuffling the business logic modules among the business logic servers of a cluster if it is ascertained that the load level on any of the business logic servers is unacceptably high.

In accordance with one embodiment of the present invention, there is provided a load balancing technique which involves reconfiguring the business logic servers using business logic module-specific load information collected by the IDAs. Unlike the prior art situation wherein the relative load information is collected at the server level, the present invention preferably obtains the load information on the business logic modules themselves. With this information, it is possible to ascertain the specific business logic module(s) that contribute to server stress, and to identify the business logic module(s) that are relatively idle at any given point in time. Once identified, the business logic modules may be shuffled among the business logic servers of the cluster to allow the load to be better balanced among the business logic servers:

FIG. 10 illustrates, in accordance with one embodiment of the present invention, the steps involved in performing load balancing by shuffling the business logic modules among the business logic servers of a cluster if it is ascertained that the load level on any of the business logic servers is unacceptably high, e.g., greater than some predefined load level for some predefined time period.

In step 1002, the load levels for the business logic servers of the cluster are ascertained. Typically, the load level information is transmitted periodically or on demand from the business logic servers to the IDA. If the load level on any particular business logic server is greater than a predefined acceptable load level (as determined in step 1004), the method proceeds to step 1006 to ascertain the business logic module(s) that are causing the high load level of the stressed servers. Generally, the identification of the business logic modules that are causing server stress may be made by reviewing the business logic module-specific load information received periodically or on demand by the IDA (e.g., by reviewing the processing demand placed on individual business logic modules that exist on the stressed server).

Once the identity of the business logic module(s) that are causing server stress is identified, the method may proceed to an optional step 1008 to warn the system operator and give the operator an opportunity to take action to increase the processing capability of the business logic software that causes the server stress condition (since additional processing capability may relieve stress on the stressed servers) and/or reduce the demand on the business logic servers experiencing the server stress condition. If no action is taken or if the default is automatic load balancing, the method proceeds to step 1010 to perform load balancing among the existing business logic servers of the business logic stage.

Figure 11:
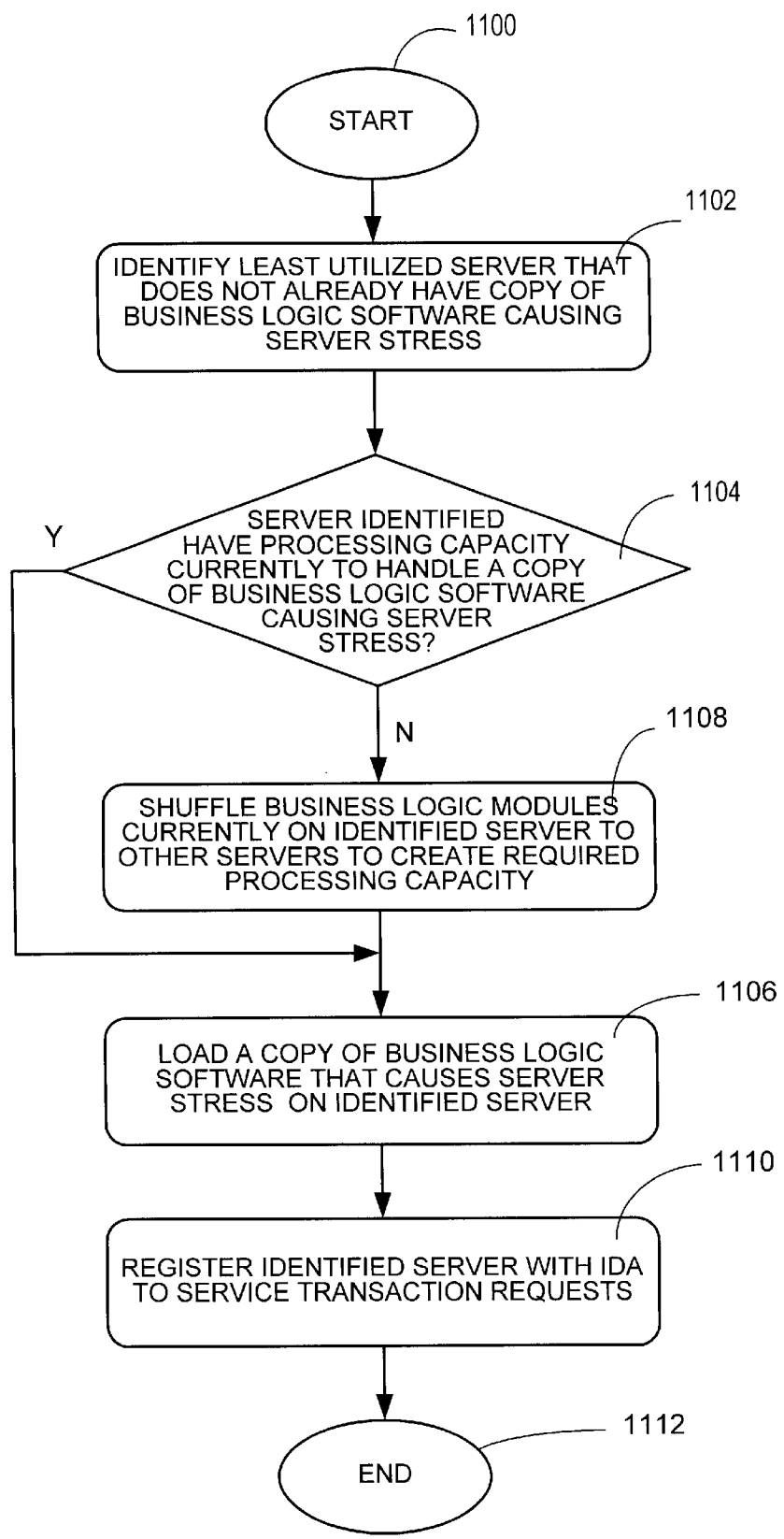
FIG. 11 illustrates in detail, in accordance with one embodiment of the present invention, the step of shuffling business logic modules among servers of the cluster to increase the processing capability of the business logic software identified to be the cause of server stress.

Load balancing may be performed only among local servers, as is discussed in connection with FIG. 11 in one embodiment, or may be performed in a manner so as to also include the remote servers, as is discussed in connection with FIG. 12 in one embodiment. After load balancing is performed, the method returns to step 1002 to continue to monitor the load level information on the servers to ascertain whether load balancing has addressed the server stress problem. Preferably, some time should be allowed to permit the routing mechanism to distribute the load among the reconfigured servers of the cluster before load balancing is performed again (to ensure system stability and prevent wild gyrations in the distributed loads among the servers).

As mentioned earlier, load balancing involves identifying servers of the cluster that can be loaded with copies of the business logic software identified to be causing server stress so that the demand on that business logic software may be spread among a greater number of servers of the cluster. FIG. 11 illustrates, in accordance with one embodiment of the present invention, the steps for performing step 1010 of FIG. 10, i.e., for shuffling business logic modules among servers of the cluster to increase the processing capability of the business logic software identified to be the cause of server stress.

In step 1102, the method searches for the least utilized server in the cluster (or a powerful server in the cluster that is relatively lightly loaded) that does not already have a copy of the business logic module identified to be the cause of server stress already implemented thereon. Preferably, the selected server is also one that is known to the IDA to have the ability or compatibility to accept another copy of the business logic module identified to be the cause of server stress. In step 1104, the server identified as a candidate to relieve the server stress condition is evaluated to ascertain whether it has sufficient processing capability to receive a copy of the business logic software identified to be the cause of server stress. If there is sufficient processing capability in the server identified in step 1102 (as determined in step 1104), the method proceeds to step 1106 wherein another copy of the business logic software that was identified to be the cause of server stress is implemented on that server in order to increase the processing capability of the business logic module identified earlier to be the cause of server stress.

On the other hand, if there is not sufficient processing capability in the server identified in step 1102 to accept a copy of the business logic software ascertained to be the cause of server stress (as determined in step 1104), the method proceeds to step 1108 to attempt to move one or more of the business logic modules currently implemented on that server to another server to create the needed processing capability. For example, one or more existing business logic modules on the server identified in step 1102 may be moved onto another server of the cluster that is also relatively lightly loaded to make room for a copy of the business logic module ascertained to be the cause of server stress to be loaded onto the server identified in step 1102. It is preferable, of course that due attention is paid (by checking with the IDA beforehand) to compatibility issues during business logic module shuffling. The business logic IDA may accomplish this by issuing appropriate commands to the selected business logic server(s) through its reconfiguration facility.

Thereafter, the method proceeds to step 1106, which, as mentioned earlier, represents the step wherein another copy of the business logic software that was identified to be the cause of server stress is implemented on that server in order to increase the processing capability of the business logic module identified earlier to be the cause of server stress. In step 1110, the selected server having thereon another copy of the business logic software that requires the increased fault tolerance level is registered with the local IDA (step 914) to begin accepting transaction requests. As mentioned, in one embodiment, the newly registered server may be (but not required to be) registered as uncertified to allow the load to be increased gradually in accordance with the software upgrade method described earlier herein.

In one embodiment, load balancing may be performed by increasing by one at a time the number of servers having thereon the business logic software that has the high demand. However, it is contemplated that if the traffic spike on a given business logic software is fairly severe (as ascertained by reviewing the historical profile of transaction requests), a greater number of servers may be simultaneously loaded with copies of the business logic software that causes server stress in order to more quickly relieve the stress condition. Further, since the IDA is aware of the processing capabilities of the business logic servers, the additional number of servers required may be moderated if one of the more powerful servers is employed to increase the processing capability of the business logic software causing the original server stress condition. In some cases, it is contemplated that the number of business logic servers that are loaded with copies of the business logic software that causes the stress condition may stay the same after shuffling, albeit with the more powerful servers of the cluster being substituted in to increase the processing capability of that business logic software.

Figure 12:
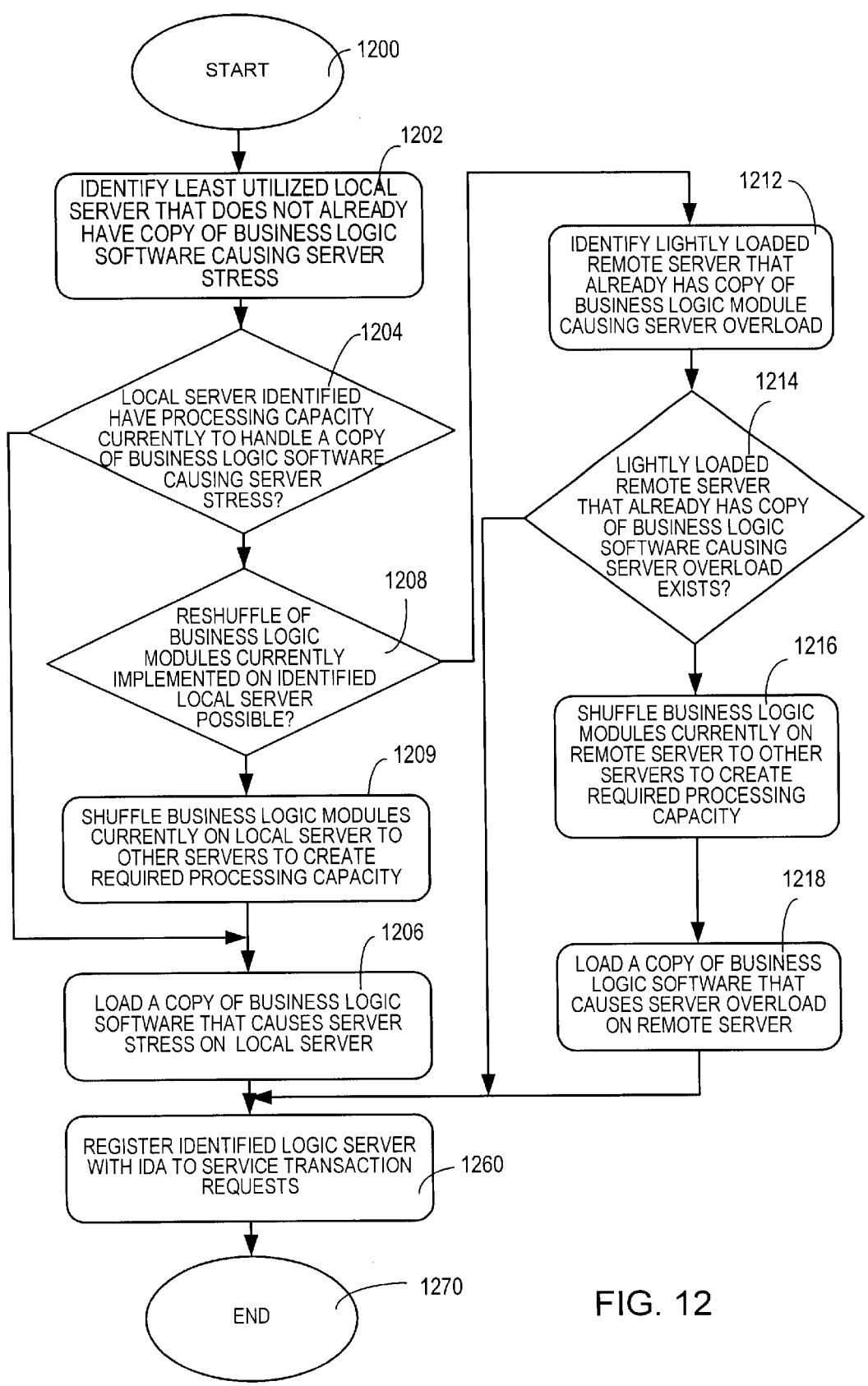
FIG. 12 is a flowchart illustrating, in accordance with one embodiment of the present invention, a method for performing load balancing by shuffling the business logic modules among the remote and local business logic servers.

FIG. 12 is a flowchart illustrating, in accordance with one embodiment of the present invention, a method for performing load balancing by shuffling the business logic modules among the remote and local business logic servers. As discussed in connection with FIG. 6, the clusters of the clustered computer system may be scattered among different geographically dispersed sites to improve service to geographically dispersed customers and/or to increase survivability in case of a natural/manmade disaster that affects one site. In one embodiment, the business logic servers of a remote site (e.g., remote site 606 of FIG. 6) may be employed to provide server stress relief for a particular business logic module associated with a local site (e.g., local site 604 of FIG. 6).

In step 1202, the method searches for the least utilized local server in the local cluster (or a local, powerful server in the local cluster that is relatively lightly loaded) that does not already have a copy of the business logic software identified to be the cause of server stress already implemented thereon. Preferably, the selected local server is also one that is known to the IDA to have the ability or compatibility to accept another copy of the business logic software identified to be the cause of server stress. In step 1104, the server identified as a candidate to relieve the stress condition is evaluated to ascertain whether it has sufficient processing capability to receive a copy of the business logic software identified to be the cause of server stress. If there is sufficient processing capability in the server identified in step 1202 (as determined in step 1204), the method proceeds to step 1206 wherein another copy of the business logic software that was identified to be the cause of server stress is implemented on the identified server in order to increase the processing capability of the business logic software identified earlier to be the cause of server stress.

On the other hand, if there is not sufficient processing capability in the local server identified in step 1202 to accept a copy of the business logic software ascertained to be the cause of server stress (as determined in step 1204), the method proceeds to step 1208 to ascertain whether it is possible to move one or more of the business logic modules currently implemented on that local server to another server to create the needed processing capability. For example, one or more existing business logic modules on the server identified in step 1202 may be moved onto another server of the cluster that is also relatively lightly loaded to make room for a copy of the business logic module ascertained to be the cause of server stress to be loaded onto the server identified in step 1202. This is performed in step 1209. It is preferable, of course that the new local server(s) that receive these lightly loaded copies are not the ones that also need relief through load balancing themselves. The business logic IDA may accomplish this by issuing appropriate commands to the selected business logic server(s) through its reconfiguration facility.

Since the business logic modules to be moved are lightly used anyway, it may be possible to simply delete or disable the copy of the lightly loaded business logic modules from the local server that is identified for relieving the server stress condition. This approach may be acceptable if there is sufficient fault tolerance and/or processing capability in the remaining copies of the lightly loaded business logic module after deletion. Alternatively or additionally, a copy of the business logic module that is to be moved to create additional processing bandwidth on the server that is identified for relieving the server stress condition may be loaded on a remote server to still leave the processing capacity of that lightly loaded business logic module unchanged, albeit through the use of a remote server.

If reshuffling the business logic modules existing on the local server identified in step 1202 would result in sufficient processing capacity to allow another copy of the business logic software identified to be the cause of server stress to be implemented thereon (as determined in step 1208), the method proceeds to step 1206, which, as mentioned earlier, represents the step wherein another copy of the business logic that was identified to be the cause of server stress is implemented on the identified server in order to increase the processing capability of the business logic module identified earlier to be the cause of server stress. Once the copy is implemented, the identified server is then registered with the IDA to begin receiving transaction requests to relieve the server stress condition (step 1260).

On the other hand, if it is determined in step 1208 that reshuffling the business logic modules existing on the local server identified in step 1202 would not result in sufficient processing capacity to allow another copy of the business logic software identified to be the cause of server stress to be implemented thereon, the method proceeds to step 1212 to search a suitable remote server to relieve the server stress condition on the local cluster. Prior to resorting to the remote server, the method may try to ascertain with a few local servers to determine whether shuffling locally would result in local capacity to receive another copy of the business logic software that causes the server stress.

The suitable remote server may be a lightly loaded remote server that already has a copy of the business logic software identified to be the cause of server stress already implemented thereon or a lightly loaded remote server in the remote cluster (or a powerful remote server in the remote cluster that is relatively lightly loaded) that does not already have a copy of the business logic software identified to be the cause of server stress already implemented thereon but can also accept, or be arranged via shuffling at the remote site to accept, a copy of the business logic software identified to be the cause of server stress.

In step 1212, the remote cluster is first searched for the presence of a lightly loaded remote server that already has a copy of the business logic software identified to be the cause of server stress already implemented thereon. If such a server exists (as determined in step 1214), it is registered with the local IDA and the local IDA may subsequently employ it to relieve the server stress condition locally.

On the other hand, if there does not exist a lightly loaded remote server that already has a copy of the business logic software identified to be the cause of server stress already implemented thereon, the method proceeds to step 1216 to search for the least utilized server in the remote cluster (or a powerful server in the remote cluster that is relatively lightly loaded) that does not already have a copy of the business logic software identified to be the cause of server stress implemented thereon. In step 1218, the remote server identified as a candidate to relieve the stress condition is loaded with another copy of the business logic software that was identified to be the cause of server stress in order to increase the processing capability of the business logic software identified earlier to be the cause of server stress. Once the copy is implemented, the remote server is then registered with the local IDA to begin receiving transaction requests to relieve the server stress condition.

Thus far, the discussion regarding load balancing has revolved around reactive load balancing, i.e., balancing the load after the stress condition is detected on one of the business logic servers. There are times, however, when such load balancing is insufficient to address the stress condition. By way of example, certain business logic modules may experience an increase in usage so rapidly that there may be no time to perform load balancing reactively (i.e., after detection of the stress condition) without suffering poor transaction request processing performance or increased reliability risks due to dangerously high stress conditions.

In accordance with one aspect of the present invention, a potential stress condition may be averted by performing the load balancing among the local servers and/or the remote servers prospectively. Since the IDAs receive the historical profiles of transaction requests, data mining techniques may be applied to ascertain the trends of demand placed on various business logic software programs. By way of example, if the business logic software services bank withdrawals, an examination of the historical profiles of transaction requests may reveal that bank withdrawals tend to happen prior to a major holiday and may be the heaviest at the close of the business day immediately preceding the holiday. This information, coupled with other information tracked by the IDA such as the distribution of copies of the requisite business logic software among servers of the local cluster, the capabilities of the servers of the local cluster, the demand that may also be placed on other business logic modules (which are implemented on the servers of the local cluster) at the same time the peak demand is expected to happen on one of the business logic software, may be employed to determine whether a stress condition is likely to occur on one or more servers of the local cluster and whether load balancing should be performed prior to the expected peak demand.

Figure 13:
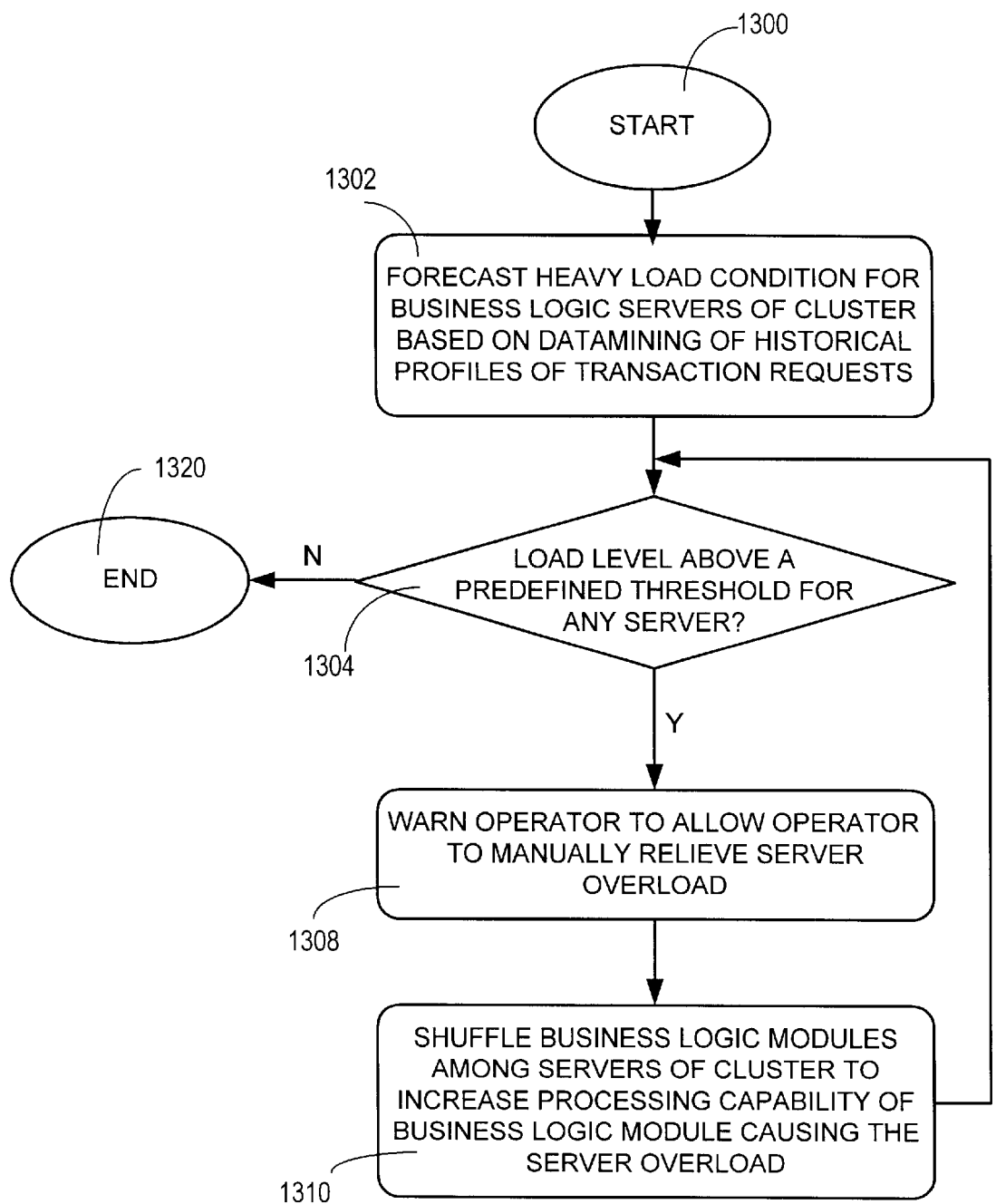
FIG. 13 illustrates, in accordance with one embodiment of the present invention, the steps involved in performing load balancing prospectively by shuffling the business logic modules among the business logic servers of a cluster if it is ascertained prospectively from data available to IDAs, such as the historical profile, that the load level on any of the business logic servers may become unacceptably high at some point in time.

FIG. 13 illustrates, in accordance with one embodiment of the present invention, the steps involved in performing load balancing prospectively by shuffling the business logic modules among the business logic servers of a cluster if it is ascertained prospectively from data available to IDAs (such as the historical profile) that the load level on any of the business logic servers may become unacceptably high at some point in time, e.g., greater than some predefined load level.

In step 1302, the load levels for the business logic servers of the cluster are forecasted from data available to IDAs (such as the historical profiles of transaction requests). Typically, the load level information is forecasted using a data mining technique. Implementations of data mining is further discussed in the aforementioned data-mining related applications, which are incorporated herein by reference.

If the load level on any particular business logic server is forecasted to be greater at a given point in time than a predefined acceptable load level (as determined in step 1304), the method to an optional step 1308 to warn the system operator and give the operator an opportunity to take action to increase the processing capability of the business logic software that is forecasted to cause the server stress (since additional processing capability may relieve the potential server stress from the anticipated increase in traffic) and/or reduce the forecasted demand on the business logic software (e.g., by diverting traffic away from this cluster). If no action is taken or if the default is automatic load balancing, the method proceeds to step 1310 to perform load balancing among the existing business logic servers of the business logic stage. Preferably, the load balancing is performed only a short time before the expected stress condition so that interference with the normal distribution of processing capacity among the business logic servers is kept minimal. Exemplary techniques of load balancing among local servers and among both local and remote servers are discussed in details in connection with FIGS. 11 and 12 herein and is not repeated here for brevity's sake.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for maintaining a predefined acceptable fault tolerance level for a plurality of software modules implementing a software program running on a first plurality of computers coupled together in a cluster configuration in a first cluster in a clustered computer system, said first plurality of computers being coupled to a first intelligent director agent, said method comprising:
   tracking, using said first intelligent director agent, status of said software modules running on said first plurality of computers;
   ascertaining a fault tolerance level associated with said software program, said ascertaining being ascertained by examining said status of said software modules running on said first plurality of computers;
   if said fault tolerance level is below said predefined acceptable fault tolerance level, searching for a first suitable computer among said first plurality of computers to load another module of said software program thereon, said first suitable computer representing a computer of said first plurality of computers that does not have a module of said software program running thereon, said first suitable computer being compatible to execute said another module of said software program; and
   if said first suitable computer is available, loading said another module of said software program on said first suitable computer, registering said first suitable computer as a computer capable of servicing transaction requests pertaining to said software program after said another module of said software program is loaded onto said first suitable computer, and routing said transaction requests pertaining to said software program to said first suitable computer after said registering.

2. The method of claim 1 further comprising issuing a warning to an operator of said clustered computer program if said fault tolerance level is ascertained to be below said predefined fault tolerance level.

3. The method of claim 1 wherein said first suitable computer further represents a least heavily loaded computer of said first plurality of computers that does not have said module of said software program running thereon.

4. The method of claim 1 wherein said software program represents a software program adapted for an e-commerce application through the Internet.

5. The method of claim 1 wherein said plurality of computers are heterogeneous.

6. The method of claim 1 wherein said clustered computer system includes a second plurality of computers coupled together in a cluster configuration in a second cluster, said second cluster being located in a geographic site that is remote from a geographic site implementing said first cluster, said method comprising:
   searching, if said fault tolerance level is below said predefined acceptable fault tolerance level and said first suitable computer is not available, for a second suitable computer among said second plurality of computers to load another module of said software program thereon, said second plurality of computers being coupled together in a second cluster configuration at a geographic site remote from said first plurality of computers, said second suitable computer representing a computer of said second plurality of computers that does not have a module of said software program running thereon and being compatible to execute said another copy of said computer program;
   if said second suitable computer is available, loading said another module of said software program on said second suitable computer, registering said second suitable computer as a computer capable of servicing transaction requests pertaining to said software program after said another module of said software program is loaded onto said second suitable computer, and routing said transaction requests pertaining to said software program to said second suitable computer after said registering.

7. The method of claim 6 wherein said loading another module of said software program on said second suitable computer is performed responsive to instructions from said first intelligent director agent.

8. The method of claim 1 wherein said software program represents a software program that implement business logic in said clustered computer system.

9. The method of claim 1 further comprising issuing a warning to an operator of said clustered computer system if said fault tolerance level associated with said software program is ascertained to be below said predefined acceptable fault tolerance level.

10. The method of claim 1 further comprising removing a first software module from said first suitable computer to allow said first suitable computer to have sufficient processing capability to be loaded with said another module of said software program.

11. A method for maintaining a predefined acceptable fault tolerance level for a plurality of software modules implementing a software program running on a first plurality of computers coupled together in a cluster configuration in a first cluster in a clustered computer system, said first plurality of computers being coupled to a first intelligent director agent, wherein said clustered computer system includes a second plurality of computers coupled together in a cluster configuration in a second cluster, said second cluster being located in a geographic site that is remote from a geographic site implementing said first cluster, said method comprising:

tracking, using said first intelligent director agent, status of said software modules running on said first plurality of computers;

ascertaining a fault tolerance level associated with said software program, said ascertaining being ascertained by examining said status of said software modules running on said first plurality of computers;

if said fault tolerance level is below said predefined acceptable fault tolerance level, searching for a first suitable computer among said first plurality of computers to load another module of said software program thereon, said first suitable computer representing a computer of said first plurality of computers that does not have a module of said software program running thereon, said first suitable computer being compatible to execute said another module of said software program;

if said first suitable computer is available, loading said another module of said software program on said first suitable computer, registering said first suitable computer as a computer capable of servicing transaction requests pertaining to said software program after said another module of said software program is loaded onto said first suitable computer, and routing said transaction requests pertaining to said software program to said first suitable computer after said registering;

searching, if said fault tolerance level is below said predefined acceptable fault tolerance level and said first suitable computer is not available, for a second suitable computer among said second plurality of computers to load another module of said software program thereon, said second plurality of computers being coupled together in a second cluster configuration at a geographic site remote from said first plurality of computers, said second suitable computer representing a computer of said second plurality of computers that does not have a module of said software program running thereon and being compatible to execute said another module of said software program, wherein said searching for said second suitable computer employs software module-specific information stored at a second intelligent director agent associated with said second plurality of computers at said second site; and if said second suitable computer is available, loading said another module of said software program on said second suitable computer, registering said second suitable computer as a computer capable of servicing transaction requests pertaining to said software program after said another module of said software program is loaded onto said second suitable computer, and routing said transaction requests pertaining to said software program to said second suitable computer after said registering.

12. A method for maintaining a predefined acceptable fault tolerance level for a plurality of software modules implementing a software program running on a first plurality of computers coupled together in a cluster configuration in a first cluster in a clustered computer system, said first plurality of computers being coupled to a first intelligent director agent, wherein said clustered computer system includes a second plurality of computers coupled together in a cluster configuration in a second cluster, said second cluster being located in a geographic site that is remote from a geographic site implementing said first cluster, said method comprising:

tracking, using said first intelligent director agent, status of said software modules running on said first plurality of computers;

ascertaining a fault tolerance level associated with said software program, said ascertaining being ascertained by examining said status of said software modules running on said first plurality of computers;

if said fault tolerance level is below said predefined acceptable fault tolerance level, searching for a first suitable computer among said first plurality of computers to load another module of said software program thereon, said first suitable computer representing a computer of said first plurality of computers that does not have a module of said software program running thereon, said first suitable computer being compatible to execute said another module of said software program;

if said first suitable computer is available, loading said another module of said software program on said first suitable computer, registering said first suitable computer as a computer capable of servicing transaction requests pertaining to said software program after said another module of said software program is loaded onto said first suitable computer, and routing said transaction requests pertaining to said software program to said first suitable computer after said registering;

searching, if said fault tolerance level is below said predefined acceptable fault tolerance level and said first suitable computer is not available, for a second suitable computer among said second plurality of computers to load another module of said software program thereon, said second plurality of computers being coupled together in a second cluster configuration at a geographic site remote from said first plurality of computers, said second suitable computer representing a computer of said second plurality of computers that does not have a module of said software program running thereon and being compatible to execute said another module of said software program; and if said second suitable computer is available, loading said another module of said software program on said second suitable computer, registering said second suitable computer as a computer capable of servicing transaction requests pertaining to said software program after said another module of said software program is loaded onto said second suitable computer, and routing said transaction requests pertaining to said software program to said second suitable computer after said registering, wherein said loading another module of said software program on said second suitable computer is performed responsive to instructions from said second intelligent director agent.

* * * * *